US010871800B2

(12) United States Patent
Virodov

(10) Patent No.: US 10,871,800 B2
(45) Date of Patent: *Dec. 22, 2020

(54) APPARATUSES AND METHODS FOR LINKING MOBILE COMPUTING DEVICES FOR USE IN A DUAL-SCREEN EXTENDED CONFIGURATION

(71) Applicant: Verizon Patent and Licensing Inc., Arlington, VA (US)

(72) Inventor: Alexandr Virodov, Metuchen, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 72 days.

This patent is subject to a terminal disclaimer.

(21) Appl. No.: 16/392,407

(22) Filed: Apr. 23, 2019

(65) Prior Publication Data

US 2019/0250869 A1    Aug. 15, 2019

Related U.S. Application Data

(63) Continuation of application No. 15/279,387, filed on Sep. 28, 2016, now Pat. No. 10,303,413.

(51) Int. Cl.
*G06F 3/01* (2006.01)
*G06F 3/14* (2006.01)
(Continued)

(52) U.S. Cl.
CPC ........... *G06F 1/1632* (2013.01); *G02B 30/34* (2020.01); *G06F 1/163* (2013.01); *G06F 1/1647* (2013.01);
(Continued)

(58) Field of Classification Search
CPC ............ G02B 27/2228; G02B 27/0179; G02B 2027/0181–0187; G06F 3/1423; G06F 1/1632; G09G 5/12
See application file for complete search history.

(56) References Cited

U.S. PATENT DOCUMENTS 8,753,128 B2 * 6/2014 Alameh ................ G06F 1/1632
439/165
8,882,281 B2 * 11/2014 Bauer, Jr. ............. A42B 3/0426
359/879

(Continued)

FOREIGN PATENT DOCUMENTS

WO    WO-2014190952 A1 * 12/2014 ........... G06F 1/1616

*Primary Examiner* — Patrick F Marinelli

(57) ABSTRACT

An exemplary linking apparatus includes a first data transfer connector plug configured to mate with a first data transfer connector receptacle of a first mobile computing device. The apparatus also includes a second data transfer connector plug configured to mate with a second data transfer connector receptacle of a second mobile computing device. To house the first and second data transfer connector plugs, the apparatus includes a housing that is configured to facilitate a positioning of the first and second mobile computing devices in a dual-screen extended configuration in front of respective eyes of a user. The apparatus further includes a plurality of conductors electrically coupling the first and second data transfer connector plugs to provide a data transfer link between the first and second mobile computing devices when the first and second data transfer connector plugs are mated with the first and second data transfer connector receptacles, respectively.

20 Claims, 11 Drawing Sheets

(51) Int. Cl.
*G06F 1/16* (2006.01)
*G02B 27/22* (2018.01)
*H04L 29/08* (2006.01)
*G06F 3/147* (2006.01)
*H04W 4/02* (2018.01)
*H04W 88/02* (2009.01)
*G06F 3/041* (2006.01)
*G09G 3/00* (2006.01)
*G02B 30/34* (2020.01)
*G09G 5/12* (2006.01)
*G09G 5/34* (2006.01)

(52) U.S. Cl.
CPC .............. *G06F 3/011* (2013.01); *G06F 3/147* (2013.01); *G06F 3/1423* (2013.01); *G09G 3/003* (2013.01); *H04L 67/1072* (2013.01); *G06F 3/0416* (2013.01); *G09G 5/12* (2013.01); *G09G 5/346* (2013.01); *H04W 4/026* (2013.01); *H04W 88/02* (2013.01)

(56) References Cited

U.S. PATENT DOCUMENTS

| | | | | |
|---|---|---|---|---|
| 8,957,835 | B2* | 2/2015 | Hoellwarth | G02B 27/017 345/8 |
| 9,429,759 | B2* | 8/2016 | Hoellwarth | G02B 27/017 |
| 9,482,869 | B2* | 11/2016 | Hoellwarth | G02B 27/017 |
| 9,595,237 | B2* | 3/2017 | Hoellwarth | G02B 27/017 |
| 9,646,573 | B2* | 5/2017 | Hoellwarth | G02B 27/017 |
| 9,646,574 | B2* | 5/2017 | Hoellwarth | G02B 27/017 |
| 9,749,451 | B2* | 8/2017 | Hoellwarth | G02B 27/017 |
| 9,874,755 | B2* | 1/2018 | Tempel | G02B 27/0176 |
| 10,034,398 | B2 | 7/2018 | Kurian et al. | |
| 10,085,004 | B2* | 9/2018 | Tempel | G06T 19/006 |
| 10,096,301 | B2 | 10/2018 | Ahn et al. | |
| 10,154,247 | B2 | 12/2018 | Nadler | |
| 10,262,387 | B2* | 4/2019 | Spitzer | G06F 3/013 |
| 2010/0123961 | A1* | 5/2010 | Bauer, Jr. | A42B 3/0426 359/880 |
| 2010/0156913 | A1* | 6/2010 | Ortega | G06F 3/1438 345/520 |
| 2011/0143769 | A1* | 6/2011 | Jones | G06F 1/1624 455/456.1 |
| 2012/0081269 | A1* | 4/2012 | de Paz | G06F 1/1616 345/1.3 |
| 2012/0252230 | A1* | 10/2012 | Alameh | H04M 1/0256 439/31 |
| 2014/0075210 | A1 | 3/2014 | Rich et al. | |
| 2015/0092326 | A1* | 4/2015 | Mantha | G06F 1/1616 361/679.3 |
| 2015/0234189 | A1* | 8/2015 | Lyons | G02B 27/0172 345/174 |
| 2015/0364113 | A1 | 12/2015 | Ahn et al. | |
| 2016/0124569 | A1* | 5/2016 | Sunwoo | H04M 1/72527 345/173 |
| 2016/0125837 | A1* | 5/2016 | Huang | G06F 1/1616 345/3.1 |
| 2016/0363773 | A1* | 12/2016 | Tempel | G02B 27/0176 |
| 2016/0366399 | A1* | 12/2016 | Tempel | G06T 19/006 |
| 2017/0026635 | A1 | 1/2017 | Nadler | |
| 2017/0208697 | A1 | 7/2017 | Kurian et al. | |
| 2017/0251199 | A1* | 8/2017 | Zhang | H04N 13/344 |
| 2017/0289529 | A1* | 10/2017 | Carollo | G02B 27/2207 |
| 2017/0315648 | A1 | 11/2017 | Lin et al. | |
| 2018/0059420 | A1 | 3/2018 | Woo et al. | |
| 2018/0063307 | A1 | 3/2018 | Hoellwarth | G02B 27/017 |
| 2018/0084093 | A1 | 3/2018 | Hoellwarth | G02B 27/017 |
| 2018/0088886 | A1 | 3/2018 | Virodov | |
| 2018/0088958 | A1 | 3/2018 | Remis et al. | |
| 2018/0091866 | A1 | 3/2018 | Sun et al. | |
| 2018/0097920 | A1* | 4/2018 | Hoellwarth | G02B 27/017 |
| 2018/0136720 | A1* | 5/2018 | Spitzer | G09G 5/006 |
| 2018/0137598 | A1* | 5/2018 | Spitzer | G06F 3/013 |
| 2018/0137602 | A1* | 5/2018 | Spitzer | G02B 27/2228 |
| 2018/0165053 | A1 | 6/2018 | Kuo et al. | |
| 2018/0249062 | A1 | 8/2018 | Jin et al. | |
| 2018/0292665 | A1 | 10/2018 | Al Zaydi et al. | |
| 2019/0026871 | A1* | 1/2019 | Han | G02B 7/02 |
| 2019/0027115 | A1* | 1/2019 | Jiang | G02B 27/0176 |
| 2019/0064900 | A1* | 2/2019 | Lee | G06F 1/263 |
| 2019/0116252 | A1* | 4/2019 | Hoellwarth | G02B 27/017 |

* cited by examiner

# APPARATUSES AND METHODS FOR LINKING MOBILE COMPUTING DEVICES FOR USE IN A DUAL-SCREEN EXTENDED CONFIGURATION

RELATED APPLICATIONS

This application is a continuation application of U.S. patent application Ser. No. 15/279,387, filed Sep. 28, 2016, and entitled "Apparatuses and Methods for Linking Mobile Computing Devices for Virtual Reality Experiences," which is hereby incorporated by reference in its entirety.

BACKGROUND INFORMATION

Advances in computing and networking technology have made new forms of media content possible. For example, virtual reality media content is available that may immerse viewers (or "users") into interactive virtual reality worlds that the users may experience by directing their attention to any of a variety of things being presented in the immersive virtual reality world at the same time. For example, at any time during the presentation of the virtual reality media content, a user experiencing the virtual reality media content may look around the immersive virtual reality world in any direction with respect to both a horizontal dimension (e.g., forward, backward, left, right, etc.) as well as a vertical dimension (e.g., up, down, etc.), giving the user a sense that he or she is actually present in and experiencing the immersive virtual reality world.

In some cases, users may experience immersive virtual reality worlds using mobile computing devices (e.g., standalone devices such as smartphones, digital music players, tablets devices, etc.) that are not only configured to run virtual-reality-related applications but also to run non-virtual-reality-related applications as well. For example, a mobile computing device of this type may be inserted into a virtual reality head mount (e.g., a commercially-available mounting apparatus), which may be mounted to a user's head for a presentation of a virtual reality experience to the user.

Unfortunately, certain characteristics of such mobile computing devices (e.g., the display size, the display quality and resolution, the sensor accuracy, the processing capacity, etc.) may limit the quality of the user's virtual reality experience in terms of the authenticity of the virtual reality experience, the immersiveness of the virtual reality experience, and the like. Accordingly, even for virtual reality experiences presented using modern mobile computing devices with increasingly high-quality displays, sensors, and processing capabilities, the quality of the virtual reality experiences may leave room for improvement.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
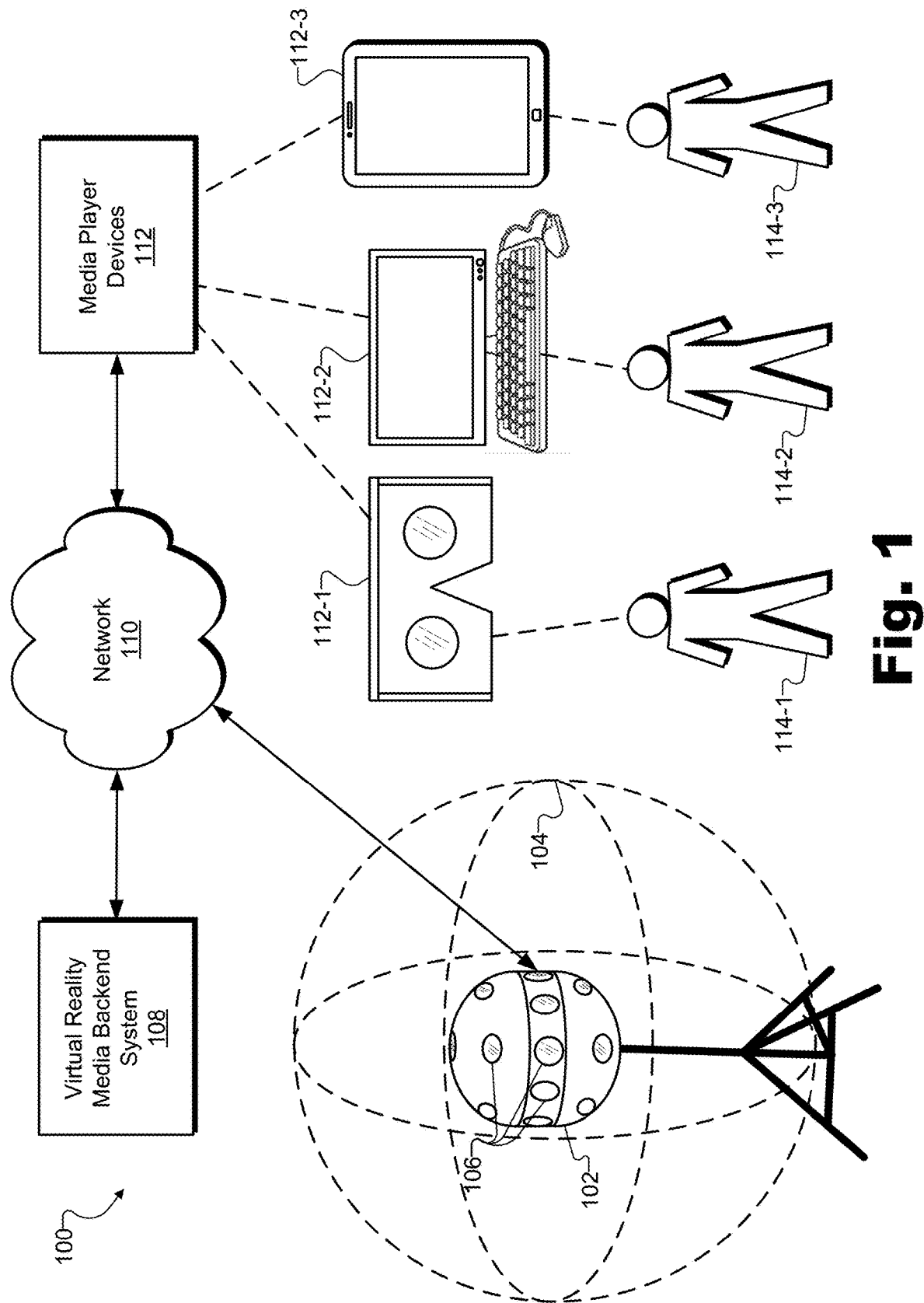
FIG. 1 illustrates an exemplary virtual reality distribution configuration that includes exemplary embodiments of a 360° camera, a virtual reality media backend system, and one or more media player devices according to principles described herein.

Apparatuses and methods for linking mobile computing devices for virtual reality experiences are described herein. For example, as will be described and illustrated below, an apparatus (e.g., a mobile computing device linking apparatus) may include a first data transfer connector plug and a second data transfer connector plug. The first data transfer connector plug may be associated with a first digital data transfer protocol (e.g., a USB protocol, a LIGHTNING protocol, a THUNDERBOLT protocol, an HDMI protocol, a FIREWIRE protocol, an Ethernet protocol, etc.) and may be configured to mate with a first data transfer connector receptacle of a first mobile computing device. For example, the first mobile computing device may be a standalone device such as a mobile phone (e.g., a smartphone), a digital music player (e.g., a digital music player with a screen), a tablet computing device, a digital reading device, or the like. As such, the first mobile computing device may be configured to run a first instance of a virtual-reality-related application, as well as to run one or more non-virtual-realityrelated applications (e.g., applications preloaded on the mobile computing device, "apps" downloaded from an online app store, etc.).

Similarly, the second data transfer connector plug may be associated with a second digital data transfer protocol (e.g., the same or a different digital data transfer protocol as the first digital data transfer protocol) and may be configured to mate with a second data transfer connector receptacle of a second mobile computing device. For example, the second mobile computing device may be the same type (e.g., brand, model, etc.) of mobile computing device as the first mobile computing device, or may be a different type of mobile computing device than the first mobile computing device. Like the first mobile computing device, the second mobile computing device may be configured to run a second instance of the virtual-reality-related application, as well as to run one or more non-virtual-reality-related applications (e.g. the same or other "apps" that the first mobile computing device is configured to run).

The apparatus may further include a housing that houses the first and second data transfer connector plugs. In some examples, the housing may be configured to facilitate a positioning of the first and second mobile computing devices in front of respective eyes of a user in a dual-screen extended configuration (e.g., a dual-screen extended landscape configuration, a dual-screen extended portrait configuration, etc.) for an enhanced presentation of a virtual reality experience to the user. For example, the housing may facilitate the positioning of the first and second mobile computing devices by allowing the first and second data transfer connector plugs to mate with the first and second data transfer connector receptacles, respectively, only when the first and second mobile computing devices are physically adjacent to one another (e.g., only when the first and second mobile computing devices are in close proximity to one another and/or in the dual-screen extended configuration, etc.). In other words, in certain examples, the first and second data transfer connector plugs of the apparatus may not be able to mate with the first and second data transfer connector receptacles of the mobile computing devices when the mobile computing devices are not physically adjacent (e.g., are not in close proximity to one another and/or are not in the dual-screen extended configuration, etc.).

As used herein, two mobile computing devices may be positioned in a "dual-screen extended configuration" when the mobile computing devices are positioned adjacent to one another with display screens of both phones facing in substantially the same direction (i.e., such that a user can see both screens at once). As used herein, mobile computing devices may be positioned adjacent to one another by touching (e.g., abutting) one another or by being in close proximity to one another. For example, mobile computing devices positioned adjacent to one another may be no more than 20 centimeters ("cm") from one another in certain examples, and no more than 10 cm, 5 cm, 3 cm, and/or 1 cm from one another in the same or other examples.

In some examples, mobile computing devices positioned in a dual-screen extended configuration may both be positioned according to a same particular orientation. For example, the mobile computing devices may be positioned in a "dual-screen extended landscape configuration" when both mobile computing devices in the dual-screen extended configuration are in a landscape (i.e., horizontal) orientation. Similarly, the mobile computing devices may be positioned in a "dual-screen extended portrait configuration" when both mobile computing devices in the dual-screen extended configuration are in a portrait (i.e., vertical) orientation. In other examples, mobile computing devices positioned in a dual-screen extended configuration may each be positioned according to a different particular orientation. For example, one mobile computing device may be positioned in a landscape orientation while the other mobile computing device may be positioned in a portrait orientation.

Respective data transfer connector receptacles (e.g., USB receptacles, LIGHTNING receptacles, etc.) may be facing one another when the mobile computing devices are in a dual-screen extended configuration. Additionally, each mobile computing device in a dual-screen extended configuration may be positioned at an angle of approximately 90° or less than 90° (e.g., between 45° and 90°) with respect to a line symmetrically bisecting the configuration of the mobile computing devices between the mobile computing devices. In other words, the display screens of the mobile computing devices in the dual-screen extended configuration may be coplanar or may be angled inwardly, so as to, for example, better contour around a head of a user when the mobile computing devices are in front of the respective eyes of the user for the enhanced presentation of the virtual reality experience.

Examples of dual-screen extended configurations will be illustrated and described in more detail below. In particular, examples of dual-screen extended landscape configurations will be illustrated and described herein. While many of the examples described and illustrated below will relate to dual-screen extended landscape configurations, it will be understood that the same principles illustrated and described may apply to any type of dual-screen extended configuration such as dual-screen extended portrait configurations, dual-screen extended configurations with mixed orientations, or any other dual-screen extended configurations as may serve a particular implementation. While dual-screen extended landscape configurations may be preferred for certain implementations, because of variations in mobile devices (e.g., shapes and sizes of display screens, placement and orientation of data transfer connector receptacles, etc.), other suitable configurations may be used in other implementations.

The apparatus may further include a plurality of conductors electrically coupling the first data transfer connector plug with the second data transfer connector plug. The plurality of conductors may be housed internally within the housing of the apparatus. In some examples, the plurality of conductors may provide, when the first and second data transfer connector plugs are mated with the first and second data transfer connector receptacles, respectively, a data transfer link between the first and second mobile computing devices. As such, data associated with the first and second instances of the virtual-reality-related application running, respectively, on the first and second mobile computing devices may be transferred over the data transfer link in accordance with the first and second digital data transfer protocols in order to enable the enhanced presentation of the virtual reality experience to the user when the first and second mobile computing devices are positioned in front of the respective eyes of the user in the dual-screen extended landscape configuration.

While the first and second mobile computing devices are physically and communicatively linked by a mobile computing device linking apparatus ("linking apparatus") as described above, the mobile computing devices may run respective instances of the virtual-reality-related application to present an enhanced virtual reality experience to a user. A virtual reality experience in which two mobile computing devices, rather than one mobile computing device, are used to provide the experience may increase the display resolution, processing power, memory resources, sensor accuracy, and/or any other resource, input, and/or attribute associated with the presentation of the virtual reality experience.

A virtual reality experience (e.g., whether presented using one mobile computing device or enhanced with two mobile computing devices physically and communicatively linked using a linking apparatus) may involve presenting, on a display screen of one or both of the mobile computing devices associated with the user, a field of view of an immersive virtual reality world. The immersive virtual reality world may be fully immersive in the sense that the user may not be presented with any image of the real world in which the user is located while the user is experiencing the immersive virtual reality world, in contrast to certain "augmented reality" technologies. However, while real-world scenery directly surrounding the user may not be presented together with the immersive virtual reality world, the immersive virtual reality world may, in certain examples, be generated based on data (e.g., video and/or audio data) representative of camera-captured real-world scenery rather than animated or computer-generated scenery of imaginary worlds such as those commonly generated for video games, animated entertainment programs, and so forth. For example, as will be described in more detail below, camera-captured real-world scenery may include real-world places (e.g., city streets, buildings, landscapes, etc.), real-world events (e.g., live sporting events, large celebrations such as New Year's Eve or Mardi Gras, etc.), fictionalized live action entertainment (e.g., virtual reality television shows, virtual reality movies, etc.), and so forth.

The user may experience the immersive virtual reality world by way of the field of view. For example, the field of view may include content of the immersive virtual reality world (e.g., images depicting scenery and objects surrounding the user within the immersive virtual reality world). Additionally, the field of view may dynamically change in response to user input provided by the user as the user experiences the immersive virtual reality world. For example, the media player device may detect user input (e.g., moving or turning the display screen upon which the field of view is presented) that represents a request to shift additional content into the field of view in place of the previous content included within the field of view. In response, the field of view may display the additional content in place of the previous content. In this way, the field of view may essentially provide the user a "window" through which the user can easily and naturally look around the immersive virtual reality world.

Apparatuses and methods described herein for physically and communicatively linking mobile computing devices may provide significant advantages by enhancing virtual reality experiences for users. For example, by physically and communicatively linking two mobile computing devices in the dual-screen extended landscape configuration to present the virtual reality experience, rather than splitting a display screen of a single mobile computing device into two viewing areas, a much wider field of view (or a similarly wide field of view at a much higher resolution) may be provided to the user. The field of view presented in a virtual reality experience using one or more mobile computing devices may be determined by several factors such as the size of the mobile computing devices, the size of a virtual reality head mount (e.g., a commercially-available mounting apparatus used to mount the one or more mobile computing devices to the user's head), the optics of the virtual reality head mount (e.g., the focal length of lenses built into the mounting apparatus, the positions of the lenses relative to one another and relative to the user's eyes, etc.), and the like. As such, while a field of view of only 60° to 90° horizontally may be provided by certain configurations using a single mobile computing device, a much wider and fuller field of view (e.g., up to approximately a full 180° of horizontal field of view that humans are capable of perceiving) may be provided by configurations where two mobile computing devices in a dual-screen extended landscape configuration are physically and communicatively linked together. This may significantly enhance a virtual reality experience of the user by filling a much more significant portion of the user's peripheral vision with content of the immersive virtual reality world to more fully immerse the user in the immersive virtual reality world.

Moreover, when two mobile computing devices are used to present the virtual reality experience rather than one, the total screen resolution (e.g., the total number of pixels) available for presenting the immersive virtual reality world may be doubled (e.g., or approximately doubled if different types of mobile computing devices are used). This is also true for the total processing power available for rendering the immersive virtual reality world, for the total data download bandwidth available for downloading virtual reality media content representative of the immersive virtual reality world, and/or for various other finite computing resources that are available in both mobile computing devices. As a result, the mobile computing devices may provide, to each eye of the user, a significantly higher resolution picture (which may be particularly noticeable when the display screens are mounted close to the user's eyes) and may have access to significantly more processing power, download bandwidth, and/or other computing resources helpful for accessing and processing such high resolution images.

Additionally, the sensor accuracy of two mobile computing devices may be greater than the sensor accuracy of one mobile computing device used alone. For example, if the positions and orientations of the mobile computing devices with respect to one another are known (e.g., due to a calibration setup process, because the mobile computing devices are mounted within the virtual reality head mount in particular positions and orientations, etc.), sensor data captured by each mobile computing device may be compared, averaged, and/or otherwise combined (e.g., taking into account the known positions and orientations of the mobile computing devices with respect to one another) to generate more accurate sensor data than either mobile computing device may generate alone. Sensor data may be monitored by a virtual-reality-related application to determine which direction a user is looking, what direction a user is moving, whether and/or at what speed a user is moving, etc. Accordingly, by increasing the accuracy of the sensor data by combining sensor data from both mobile computing devices, the virtual reality experience may be enhanced by the mobile computing devices by more accurately determining and/or responding to user movements.

Various embodiments will now be described in more detail with reference to the figures. The disclosed methods and systems may provide one or more of the benefits mentioned above and/or various additional and/or alternative benefits that will be made apparent herein.

FIG. 1 illustrates an exemplary virtual reality distribution configuration 100 that includes exemplary embodiments of a 360° camera, a virtual reality media backend system, and one or more media player devices (e.g., mobile computing devices or other devices used to playback virtual reality media content). It will be understood that configuration 100 is exemplary only. For example, while, as will be described below, configuration 100 may generate and distribute virtual reality media content allowing a user to experience an immersive virtual reality world from a predetermined place within the immersive virtual reality world (e.g., a place corresponding to a location of the 360° camera), it will be understood that other types of virtual reality media content may be generated and distributed in other types of virtual reality distribution configurations. For example, in certain examples, a plurality of cameras (e.g., non-360° cameras) and/or other sensors surrounding a real-world scene (e.g., a real-time real-world event, etc.) may be used to capture visual and positional (i.e., depth) data with respect to objects within the real-world scene, and may generate and distribute a volumetric model of the objects within the real-world scene that the user may experience from an arbitrary vantage point (e.g., a vantage point within the real-world scene).

As shown in FIG. 1, a 360° camera 102 ("camera 102") may capture and/or generate a 360° image of real-world scenery 104 around a center point corresponding to camera 102. For example, camera 102 may capture a plurality of images from each of a plurality of segment capture cameras 106 built into or otherwise associated with camera 102, and may generate the 360° image of real-world scenery 104 by combining the plurality of images captured by segment-capture cameras 106.

Camera 102 may capture data representative of 360° images of real-world scenery 104 and may transmit the data to a virtual reality media backend system 108 ("backend system 108") by way of a network 110. After preparing and/or processing the data representative of the 360° images to generate an immersive virtual reality world based on the 360° images, backend system 108 may transmit data representative of the immersive virtual reality world to one or more media player devices 112 such as a head-mounted virtual reality device 112-1, a personal computer device 112-2, a mobile computing device 112-3, and/or to any other form factor of media player device that may serve a particular implementation. Regardless of what form factor media player devices 112 take, users 114 (e.g., users 114-1 through 114-3) may experience the immersive virtual reality world by way of media player devices 112. Each of the elements of configuration 100 will now be described in detail.

Camera 102 may be set up and/or operated by a virtual reality content creator and may include any type of camera that is configured to capture data representative of a 360° image of real-world scenery 104 around a center point corresponding to camera 102. As used herein, a 360° image is any still or video image that depicts the surroundings (e.g., real-world scenery 104) of a center point (e.g., a center point associated with the location of camera 102) on all sides along at least one dimension. For example, one type of 360° image may include a panoramic image that depicts a complete 360° by 45° ring around a center point corresponding to a camera (e.g., camera 102). Another type of 360° image may include a spherical image that depicts not only the ring around the center point, but an entire 360° by 180° sphere surrounding the center point on all sides. In certain examples, a 360° image may be based on a non-circular geometric structure. For example, certain 360° images may be based on cubes, rectangular prisms, pyramids, and/or other geometric structures that may serve a particular implementation, rather than being based on spheres.

Camera 102 may be configured to capture the data representative of the 360° image of real-world scenery 104 in any way that may serve a particular implementation. For example, as shown in FIG. 1, camera 102 may capture various segments of real-world scenery 104 using segment capture cameras 106, which may each capture an image of a single segment of real-world scenery 104 that may be combined (e.g., stitched together) with other segments to generate the 360° image of real-world scenery 104. In certain examples, segment capture cameras 106 may each represent a single camera unit (e.g., including a lens and suitable image capture hardware) built into a single 360° camera configured to capture 360° images. In other examples, camera 102 may include an array of segment capture cameras 106 that are each a single, standalone camera configured to capture standard images (e.g., images depicting less than a 360° view) that may later be combined to form the 360° image. In yet other examples, camera 102 may include one or more "fish-eye" lenses configured to capture a very wide-angle image (e.g., a spherical image or a semi-spherical image) that can be used as the 360° image or processed to generate the 360° image. Alternatively, camera 102 may include a single, standard camera that captures and/or combines a plurality of still images of real-world scenery 104 taken at different points in time (e.g., using a "panorama mode" of the camera or a similar feature) to capture still 360° images. In certain examples, camera 102 may include one or more stereoscopic cameras. Camera 102 may also use any combination of the 360° image capture techniques described above or any other capture techniques that may serve a particular implementation.

Subsequent to capturing raw image data representative of real-world scenery 104, camera 102 may generate from the raw image data a 360° image of real-world scenery 104. For example, camera 102 may be configured to automatically process the raw image data (e.g., by combining a plurality of images captured by segment capture cameras 106, by processing images captured by a fish-eye lens, etc.) to form the 360° image, and then may transmit data representative of the 360° image to backend system 108. Alternatively, camera 102 may be configured to transmit the raw image data directly to backend system 108, and any processing and/or combining of the raw image data may be performed within backend system 108.

Camera 102 may capture any real-world scenery 104 that may serve a particular embodiment. For example, real-world scenery 104 may include any indoor or outdoor real-world location such as the streets of a city, a museum, a scenic landscape, a satellite orbiting and looking down upon the Earth, the surface of another planet, or the like. Real-world scenery 104 may further include certain events such as a stock car race, a football game or other sporting event, a large-scale party such as New Year's Eve on Times Square in New York City, or other events that may interest potential users. In certain examples, real-world scenery 104 may be a setting for a fictionalized event, such as a set of a live-action virtual reality television show or movie.

In some implementations, capturing real-world scenery 104 using camera 102 may be optional. For example, a 360° image of scenery surrounding a center point may be completely computer-generated (e.g., animated) based on models of an imaginary world rather than captured from real-world scenery 104 by camera 102. As such, camera 102 may be omitted in certain examples.

Backend system 108 may be associated with (e.g., provided and/or managed by) a virtual reality media content service provider (e.g., a network service provider, a cable service provider, a satellite service provider, an Internet service provider, a provider of virtual reality mobile applications, etc.) and may be configured to provide virtual reality media content to users (e.g., subscribers of a virtual reality media content service, users who download or otherwise acquire virtual reality mobile applications) by way of media player devices 112. To this end, backend system 108 may receive, generate, process, and/or maintain data representative of virtual reality media content. For example, backend system 108 may be configured to receive camera-captured data (e.g., video data captured by camera 102) representative of a 360° image of real-world scenery 104 around a center point corresponding to camera 102. If the camera-captured data is raw image data (e.g., image data captured by each of segment capture cameras 106 that has not been combined into a 360-image), backend system 108 may unwrap, combine (e.g., stitch together), or otherwise process the raw image data to form the 360° image representative of real-world scenery 104.

Based on the camera-captured data representative of real-world scenery 104 (e.g., the 360° image), backend system 108 may generate and maintain an immersive virtual reality world (i.e., data representative of an immersive virtual reality world that may be experienced by a user). For example, backend system 108 may generate a three-dimensional ("3D") model of the immersive virtual reality world where virtual objects may be presented along with projections of real-world scenery 104 to a user experiencing the immersive virtual reality world. To generate the immersive virtual reality world, backend system 108 may perform video transcoding, slicing, orchestration, modeling, and/or any other processing that may serve a particular embodiment.

Subsequent to or concurrent with generating one or more immersive virtual reality worlds associated with one or more virtual reality media content instances (also referred to herein as "virtual reality media content programs"), backend system 108 may provide access to the virtual reality media content programs for users, such as subscribers of a virtual reality media content service operated by the virtual reality media content provider and/or users who download or otherwise acquire virtual reality mobile applications provided by the virtual reality media content provider. To this end, backend system 108 may present a field of view of the immersive virtual reality world to users by way of media player devices 112 in response to requests from media player devices 112 to access the virtual reality media content. For example, as will be described in more detail below, backend system 108 may present the field of view by transmitting data representative of content of the immersive virtual reality world (e.g., virtual objects within the immersive virtual reality world, images of real-world scenery 104, etc.) to media player devices 112, which may render the data to display the content on their screens.

Camera 102, backend system 108, and media player devices 112 may communicate with one another using any suitable communication technologies, devices, media, and/or protocols supportive of data communications, including, but not limited to, socket connections, Ethernet, data bus technologies, data transmission media, communication devices, Transmission Control Protocol ("TCP"), Internet Protocol ("IP"), File Transfer Protocol ("FTP"), Telnet, Hypertext Transfer Protocol ("HTTP"), HTTPS, Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), 4G Long Term Evolution ("LTE"), Voice over IP ("VoIP"), Voice over LTE ("VoLTE"), WiMax, Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

Network 110 may include any provider-specific network (e.g., a cable or satellite carrier network or a mobile telephone network), the Internet, a wide area network, and/or any other suitable network. Data may flow between camera 102, backend system 108, and media player devices 112 by way of network 110 using any communication technologies, devices, media, and protocols as may serve a particular implementation. While only one network 110 is shown to interconnect camera 102, backend system 108, and media player devices 112 in FIG. 1, it will be recognized that these devices and systems may intercommunicate by way of multiple interconnected networks as may serve a particular implementation.

Media player devices 112 (i.e., head-mounted virtual reality device 112-1, personal computer device 112-2, and mobile computing device 112-3) may be used by users 114 (i.e., users 114-1 through 114-3) to access and experience virtual reality media content received from backend system 108. To this end, media player devices 112 may each include or be implemented by a device capable of presenting a field of view of an immersive virtual reality world and detecting user input from a user (e.g. one of users 114) to dynamically change the content within the field of view as the user experiences the immersive virtual reality world. For example, media player devices 112 may include or be implemented by a head-mounted virtual reality device (e.g., a virtual reality gaming device), a personal computer device (e.g., a desktop computer, laptop computer, etc.), one or more mobile or wireless computing devices (e.g., standalone devices such as smartphones, tablet devices, digital reading devices, etc.), or any other device or configuration of devices that may serve a particular implementation to facilitate receiving and/or presenting virtual reality media content. Different types of media player devices 112 (e.g., head-mounted virtual reality devices, personal computer devices, mobile computing devices, etc.) may provide different types of virtual reality experiences having different levels of immersiveness for users 114.

Media player devices 112 may be configured to allow users 114 to select respective virtual reality media content programs that users 114 may wish to experience on their respective media player devices 112. In certain examples, media player devices 112 may download virtual reality media content programs that users 114 may experience offline (e.g., without an active connection to backend system 108). In other examples, media player devices 112 may request and receive data streams representative of virtual reality media content programs that users 114 experience while media player devices 112 remain in active communication with backend system 108 by way of network 110.

To facilitate users 114 in experiencing virtual reality media content, each of media player devices 112 may include or be associated with at least one display screen upon which a field of view of an immersive virtual reality world may be presented. Media player devices 112 may also include software configured to receive, maintain, and/or process data representative of the immersive virtual reality world to present content of the immersive virtual reality world within the field of view on the display screens of the media player devices. For example, media player devices 112 may include dedicated, standalone software applications (e.g., virtual-reality-related applications) configured to process and present data representative of immersive virtual reality worlds on the displays. In other examples, the software used to present the content of the immersive virtual reality worlds may include non-dedicated software such as standard web browser applications. Certain media player devices 112 (e.g., personal computer device 112-2, and mobile computing device 112-3) may be configured not only to run virtual-reality-related applications, but also to run one or more non-virtual-reality-related applications (e.g., general purpose applications).

Figure 2:
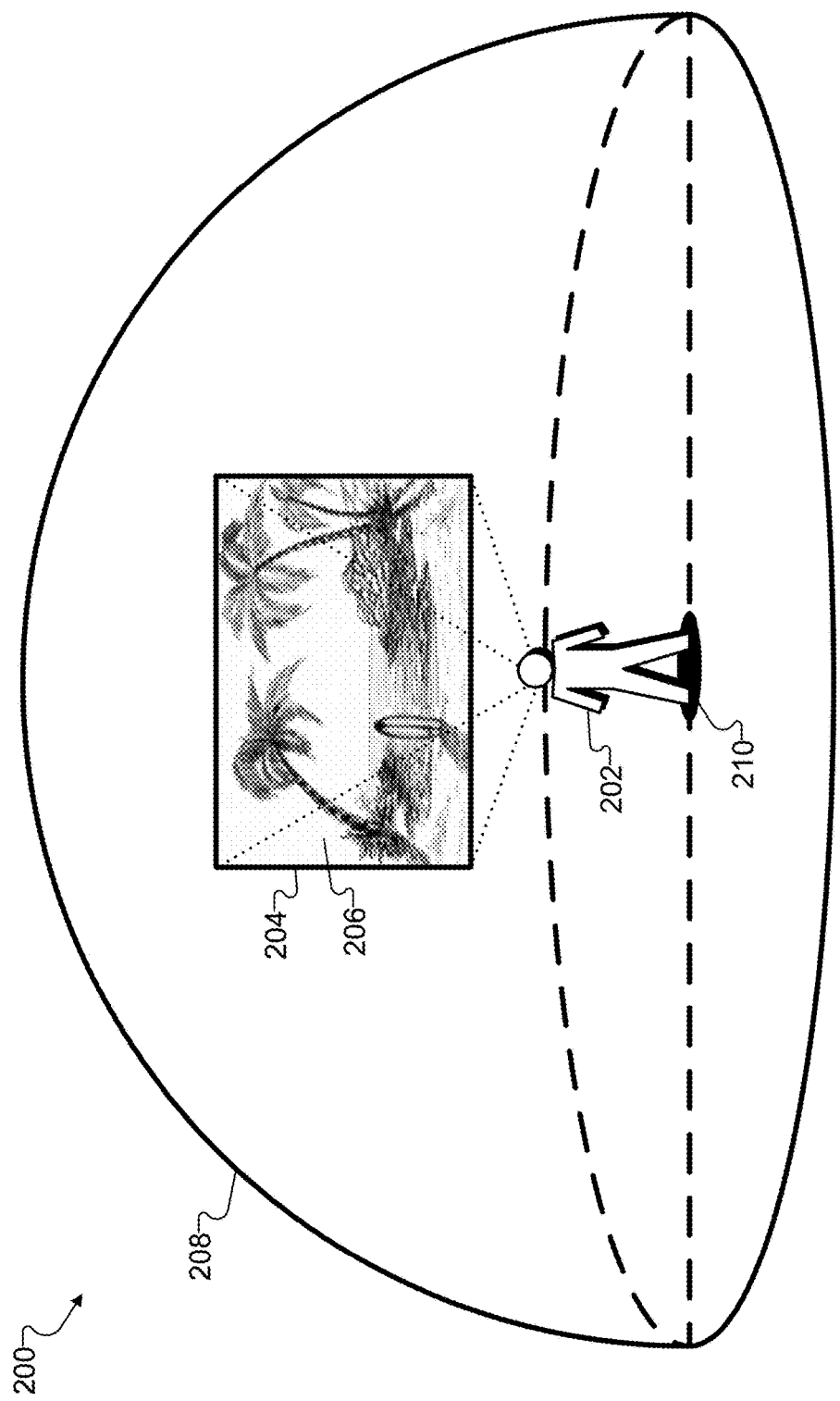
FIG. 2 illustrates an exemplary virtual reality experience in which a user is presented with an exemplary field of view that includes content of an exemplary immersive virtual reality world according to principles described herein.

FIG. 2 illustrates an exemplary virtual reality experience 200 in which a user 202 is presented with an exemplary field of view 204 that includes content 206 of an exemplary immersive virtual reality world 208. User 202 may experience immersive virtual reality world 208 ("world 208") by providing user input to dynamically change field of view 204 to display whatever content within world 208 that user 202 wishes to view. For example, the user input provided by user 202 may include an indication that user 202 wishes to look at content not currently presented within field of view 204 (i.e., content of world 208 other than content 206). For media player devices 112 such as personal computer 112-2 and/or mobile computing device 112-3, this user input may include a mouse movement, navigation key input from a keyboard, a swipe gesture, or the like. For media player devices 112 incorporating particular sensors (e.g., motion, directional, and/or orientation sensors) such as head-mounted virtual reality device 112-1 and/or mobile computing device 112-3, however, this user input may include a change to an orientation of the display screen of the media player device 112 with respect to at least one axis of at least two orthogonal axes. For example, the media player device may be configured to sense changes in orientation of the display screen with respect to an x-axis, a y-axis, and a z-axis that are all orthogonal to one another. As such, the media player device 112 may be configured to detect the change to the orientation of the display screen as user 202 experiences world 208, and the dynamic changing of the content includes gradually replacing content 206 to with other content of world 208 that is determined to be visible from a viewpoint of user 202 within world 208 according to the detected change to the orientation of the display screen with respect to the at least one axis.

To illustrate, FIG. 2 shows that content 206 may include real-world scenery depicting a beach with palm trees and a surfboard. User 202 may provide user input to a media player device by which user 202 is experiencing world 208 (e.g., one of media player devices 112) to indicate that user 202 wishes to look at content to the left of content 206 currently included within field of view 204. For example, user 202 may press a left navigation key on a keyboard, perform a swipe gesture to the right, or change the orientation of the display screen with respect to a y-axis by rotating his or her head to the left while wearing a head-mounted device. In response, the real-world scenery (i.e., the palm trees, the surfboard, etc.) may scroll to the right across field of view 204 to give user 202 a sensation that he or she is turning to look to the left in world 208. As content 206 scrolls off the right side of field of view 204, new content (not explicitly shown in FIG. 2) smoothly scrolls onto the left side of field of view 204. In this way, user 202 may provide user input to cause field of view 204 to present any part of world 208 that user 202 desires.

In FIG. 2, world 208 is illustrated as a semi-sphere, indicating that user 202 may look in any direction that is substantially forward, backward, left, right, and/or up. However, if user 202 directs field of view 204 down, world 208 may not include dynamic and/or real-world scenery content to be presented within field of view 204. For example, if world 208 includes a dynamic immersive virtual reality world (i.e., using a 360° video image), field of view 204 may present a still image representative of the ground of world 208. In other examples, field of view 204 may present nothing (i.e., a black screen), a menu, one or more virtual objects, or any other suitable image that may serve a particular implementation. In other examples, world 208 may include an entire 360° by 180° sphere so that every direction in which user 202 may direct field of view 204 is associated with dynamic and/or real-world content of world 208.

As shown in FIG. 2, world 208 may appear to surround a center point 210 associated with user 202. In some embodiments, center point 210 may correspond to a location of a camera (e.g., camera 102) used to capture the content of world 208 (e.g., including content 206). As such, center point 210 may be static or may move through world 208 in a way that user 202 is unable to control (e.g. moving through world 208 in a same manner as camera 102 moved through real-world scenery 104 during the creation of the virtual reality media content). In other embodiments, user 202 may be able to provide input to modify where center point 210 is located within world 208. For example, user 202 may hop from one center point to another (e.g., corresponding to where each of a plurality of 360° cameras captured 360° images) within world 208 or cause center point 210 to move to an arbitrary position within world 208 (e.g., when a volumetric model of a scene of world 208 is provided). While center point 210 is illustrated at the feet of user 202 for simplicity of illustration, it will be understood that center point 210 may actually be located at the eye level of user 202.

As mentioned above, different types of media player devices may provide different experiences for user 202 by presenting field of view 204 of world 208 in different ways, by receiving user input from user 202 in different ways, and so forth. For example, as illustrated and described above with respect to media player device 112-3 in FIG. 1, one type of media player device capable of providing a virtual reality experience may be a mobile computing device (e.g., a standalone device such as a smartphone, a tablet device, a music player, a digital reading device, etc.).

Mobile computing devices may include a display screen (e.g., a touch screen that covers most or all of one side of the mobile computing device) that may be used to present an immersive virtual reality world (e.g., world 208). Mobile computing devices may incorporate certain advantages of both dedicated head-mounted virtual reality devices (e.g., such as head-mounted virtual reality device 112-1) and personal computer devices (e.g., such as personal computer device 112-2) to provide a large degree of versatility for experiencing world 208. Specifically, like personal computer devices, mobile computing devices may be extremely ubiquitous due to the fact that mobile computing devices may do much more than only provide virtual reality experiences (i.e., mobile computing devices may be configured to run a large number of non-virtual-reality-related applications). As such, mobile computing devices may potentially provide virtual reality access to many more people than dedicated head-mounted virtual reality devices.

At the same time, because many mobile computing devices are equipped with motion sensors, directional sensors, orientation sensors, etc., mobile computing devices may also be configured to provide user 202 with an immersive experience comparable to that provided by dedicated head-mounted virtual reality devices. For example, one or more mobile computing devices may provide (i.e., on separate screens if two mobile computing devices are physically and communicatively linked to one another, or on a single split screen in the case of a single mobile computing device) different versions (e.g., stereoscopic versions) of field of view 204 and/or may present content 206 to fill at least some of the peripheral vision of user 202 when the one or more mobile computing devices are mounted to the head of user 202 using a relatively inexpensive virtual reality head mount (e.g., a commercially-available cardboard head mount). In other embodiments, one or more mobile computing devices may facilitate experiencing world 208 by receiving movement-based user input without the one or more mobile computing devices being mounted to the head of user 202 (e.g., by acting as a hand-held dynamic window for looking around world 208, by receiving swipe gestures on a touchscreen, and/or by other techniques that may serve a particular embodiment).

Figure 3:
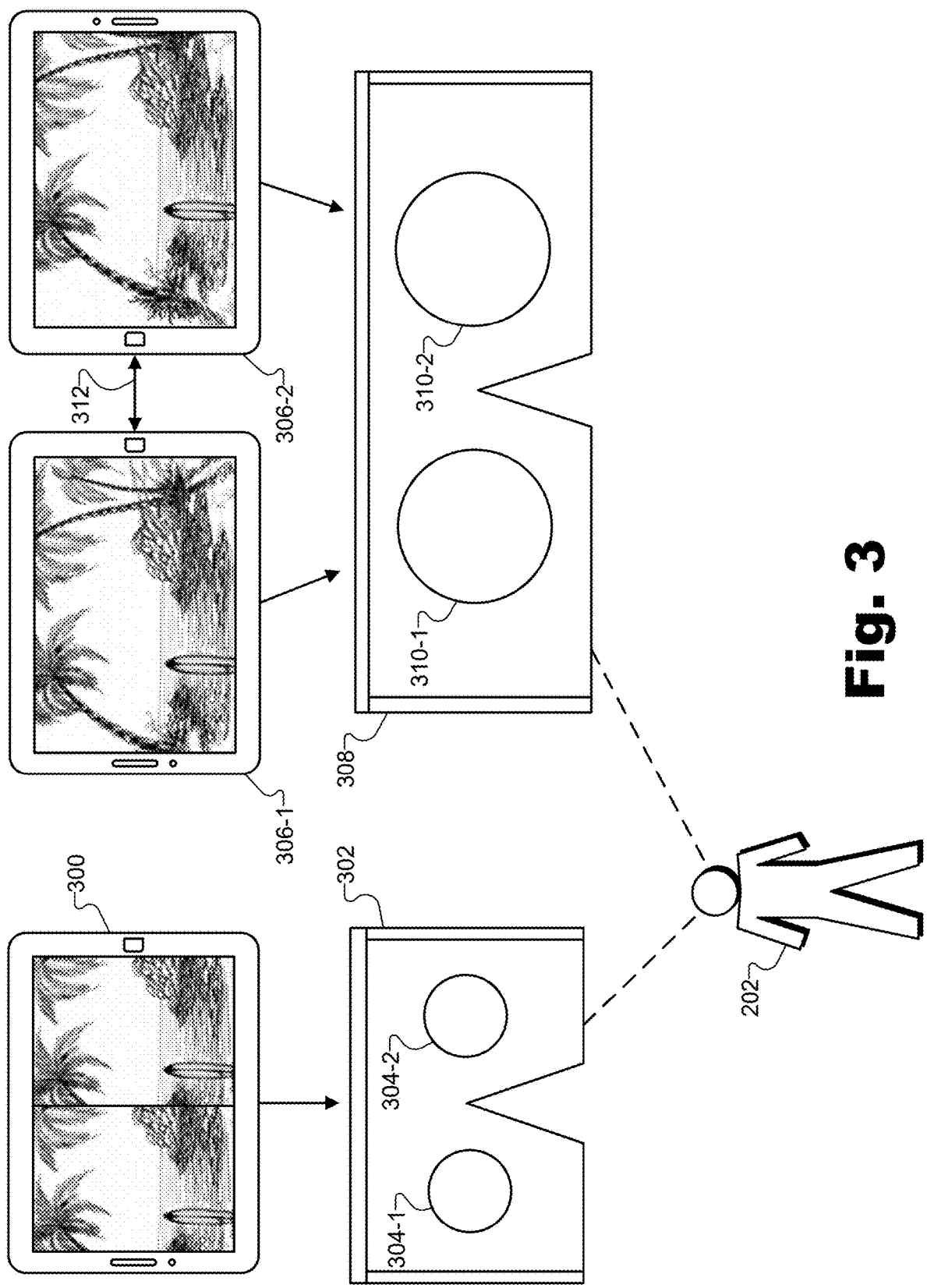
FIG. 3 illustrates exemplary configurations of mobile computing devices and virtual reality head mounts used to present virtual reality experiences to a user according to principles described herein.

To illustrate, FIG. 3 shows exemplary configurations of mobile computing devices and virtual reality head mounts used to present virtual reality experiences to user 202. More particularly, on the left-hand side of FIG. 3, a single mobile computing device configuration is illustrated in which a single mobile computing device 300 is used with a virtual reality head mount 302 configured to house the single mobile computing device during a virtual reality experience. Virtual reality head mount 302 may include optics for facilitating the experiencing of world 208 when mobile computing device 300 is seated within virtual reality head mount 302, as illustrated by lenses 304 (i.e., lenses 304-1 and 304-2 for the left and right eyes of user 202, respectively).

As shown, mobile computing device 300 may present different versions of field of view 204 of world 208 on a split screen. Accordingly, only about half of the total display resolution of mobile computing device 300 may be available for presenting field of view 204 to each eye of user 202. Depending on the optics provided (e.g., by the focal length, respective positioning, etc., of lenses 304), the field of view provided by mobile computing device 300 within virtual reality head mount 302 may, in certain examples, be limited to a total viewing angle significantly less than what user 202 can perceive (e.g., 60° to 90° of viewing angle rather than up to 180° of viewing angle that user 202 may be capable of perceiving with his or her full peripheral vision). In other examples, the optics provided by virtual reality head mount 302 may be configured to provide a wider viewing angle (e.g., greater than 90° and/or even up to the full 180° that user 202 may be capable of perceiving), but to do so, may distort and/or stretch the image presented on each half of the split screen of mobile computing device 300 such that the image may appear to user 202 to be of a relatively low quality (e.g., to be distorted, to have a low resolution, etc.).

In contrast, some or all of the limitations described above with respect to the single mobile computing device configuration may be remedied by using a dual mobile computing device configuration illustrated on the right-hand side of FIG. 3. In this configuration, as shown, dual mobile computing devices 306 (e.g., mobile computing devices 306-1 and 306-2) are used with a dual virtual reality head mount 308 having a structure configured to house both mobile computing devices 306 in a dual-screen extended landscape configuration during a virtual reality experience. Similar to virtual reality head mount 302, virtual reality head mount 308 may include optics for facilitating the experiencing of world 208 when mobile computing devices 306 are seated within virtual reality head mount 308. Specifically, as shown, a first optical lens 310-1 may have a focal length configured to bring a display of mobile computing device 306-1 into focus when mobile computing device 306-1 is housed within the structure of virtual reality head mount 308 and when virtual reality head mount 308 is mounted to the head of user 202. Similarly, a second optical lens 310-2 (referred to collectively with optical lens 310-1 as "optical lenses 310" or "lenses 310") may have a focal length configured to bring a display of mobile computing device 306-2 into focus when mobile computing device 306-2 is housed within the structure of virtual reality head mount 308 and when virtual reality head mount 308 is mounted to the head of user 202.

Unlike with mobile computing device 300, however, mobile computing devices 306 may not use split screens to present different versions of field of view 204 of world 208, but, rather, may dedicate an entire screen (or nearly an entire screen) to present a version of field of view 204. Accordingly, in the dual mobile computing device configuration, the total display resolution of one mobile computing device 306 may be dedicated to each eye of user 202 for presenting field of view 204. As such, the optics of virtual reality head mount 308 (e.g., the focal length, respective positioning, etc., of lenses 310) may be configured to present field of view 204 at a total viewing angle at least as large as the viewing angle that user 202 is capable of perceiving with his or her full peripheral vision (e.g., up to 180° of viewing angle). However, with the dual mobile computing device configuration of mobile computing devices 306 and virtual reality head mount 308, field of view 204 may be presented at approximately the full 180° viewing angle without distorting and/or stretching the image to the same degree as may be necessary with the single mobile computing device configuration described above. Accordingly, user 202 may enjoy a higher resolution rendering of field of view 204 while also being more immersed into world 208 by a larger viewing angle filling a larger percentage of the peripheral vision of user 202.

In certain examples, virtual reality head mount 308 may be curved, angled, or otherwise offset (not explicitly shown in FIG. 3) in order to contour to the head of user 202 when mounted, to house mobile computing devices 306 at an angle relative to one another that facilitates the presentation of the large viewing angle of field of view 204, to increase the comfort of user 202 when virtual reality head mount 308 is mounted to the head of user 202, and/or to otherwise enhance the virtual reality experience for user 202.

In order to physically and communicatively link mobile computing devices 306 to enhance the virtual reality experience of user 202 as described above, a link 312 between mobile computing devices 306 may be used. For example, as will be described in more detail below, link 312 may represent a physical and/or a communicative link between mobile computing devices 306. As such, link 312 may facilitate a positioning of mobile computing devices 306 in front of respective eyes of user 202 in the dual-screen extended landscape configuration for the enhanced presentation of the virtual reality experience to user 202. Additionally or alternatively, link 312 may provide a data transfer link between mobile computing devices 306 over which data (e.g., data associated with a virtual-reality-related application running on mobile computing devices 306) may be transferred to enable the enhanced presentation of the virtual reality experience to user 202.

More particularly, link 312 may include or be implemented by a mobile computing device linking apparatus that includes a first data transfer connector plug associated with a first digital data transfer protocol and configured to mate with a first data transfer connector receptacle of mobile computing device 306-1, a second data transfer connector plug associated with a second digital data transfer protocol and configured to mate with a second data transfer connector receptacle of mobile computing device 306-2, and a housing that houses the first and second data transfer connector plugs and that is configured to facilitate a positioning of mobile computing devices 306 in front of respective eyes of user 202 in the dual-screen extended landscape configuration for the enhanced presentation of the virtual reality experience to user 202. For example, the housing may facilitate the positioning of mobile computing devices 306 by allowing the first and second data transfer connector plugs to mate with the first and second data transfer connector receptacles, respectively, only when mobile computing devices 306 are physically adjacent to one another (e.g., such as to be housed together in the dual-screen extended landscape configuration within virtual reality head mount 308). The linking apparatus included by or implementing link 312 may further include a plurality of conductors electrically coupling the first data transfer connector plug with the second data transfer connector plug to provide, when the first and second data transfer connector plugs are mated with the first and second data transfer connector receptacles, respectively, a data transfer link between mobile computing devices 306 over which data associated with the first and second instances of the virtual-reality-related application is transferred in accordance with the first and second digital data transfer protocols to enable the enhanced presentation of the virtual reality experience to user 202 when mobile computing devices 306 are positioned in front of the respective eyes of user 202 in the dual-screen extended landscape configuration.

Figure 4:
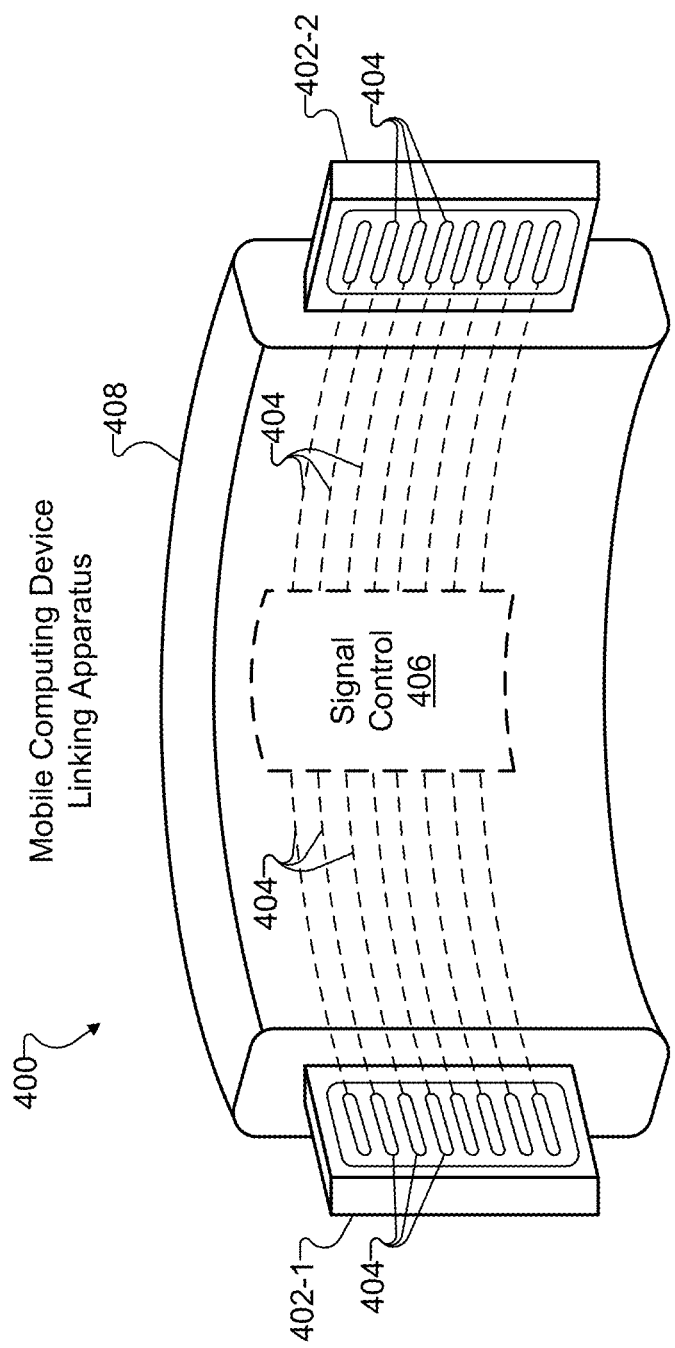
FIG. 4 illustrates an exemplary mobile computing device linking apparatus for physically and communicatively linking mobile computing devices to enhance virtual reality experiences according to principles described herein.

To illustrate, FIG. 4 shows an exemplary mobile computing device linking apparatus 400 for physically and communicatively linking mobile computing devices to enhance virtual reality experiences. As shown, linking apparatus 400 includes first and second data transfer connector plugs 402 (e.g., data transfer connector plugs 402-1 and 402-2), a plurality of conductors 404 that electrically couples data transfer connector plugs 402 with one another, a signal control block 406 by which electrical signals carried on conductors 404 may be routed, processed, etc., and a housing 408 that houses or otherwise holds together some or all of the other components of linking apparatus 400 mentioned above (i.e., data transfer connector plugs 402, conductors 404, signal control block 406) in any way as may serve a particular implementation. Each of the components of linking apparatus 400 will be described in more detail below.

In certain examples, as illustrated in FIG. 4, linking apparatus 400 may be a standalone apparatus. For example, linking apparatus 400 may be used without a corresponding virtual reality head mount (e.g., such as virtual reality head mount 308) and/or may be used with a virtual reality head mount but may be manufactured and distributed (e.g., sold, purchased, etc.) independently of the virtual reality head mount. In other examples, all or part of linking apparatus 400 may be integrated into (e.g., built into, manufactured and/or distributed with, etc.) a corresponding virtual reality head mount. Specifically, any or all of data transfer connector plug 402, housing 404, conductors 406, and/or signal control block 408 may be integrated into a virtual reality head mount such as virtual reality head mount 308, described above. For example, all of these components of linking apparatus 400 may be built into virtual reality head mount 308 during the manufacturing process of virtual reality head mount 308 (e.g., within or as part of the structure configured to house mobile computing devices 306, as described above) and may be distributed (e.g., sold, purchased, etc.) together with virtual reality head mount 308.

Data transfer connector plugs 402 may each be associated with a digital data transfer protocol, and, as such, may each be configured to mate with a data transfer connector receptacle (e.g., a data transfer connector receptacle included on a mobile computing device) associated with the same the digital data transfer protocol. For example, the digital data transfer protocols that each of data transfer connector plugs 402 are associated with may include any variant of the Universal Serial Bus ("USB") digital data transfer protocol (e.g., USB 1.0, USB 2.0, USB 3.0, USB 3.1, etc.), any variant of a proprietary digital data transfer protocol (e.g., variants of the LIGHTNING or THUNDERBOLT digital data transfer protocols used by APPLE-brand mobile computing devices, etc.), an HDMI digital data transfer protocol, an IEEE 1394 ("FIREWIRE") protocol, an Ethernet protocol, and/or any other digital data transfer protocol as may serve a particular implementation. Accordingly, the data transfer connector plugs and data transfer connector receptacles may be any suitable variant of a USB connector plug or connector receptacle (e.g., TypeA connectors, TypeB connectors, TypeC connectors, SuperSpeed connectors, MiniA connectors, MiniB connectors, MicroA connectors, MicroB connectors, etc.), any suitable variant of a proprietary connector plug or connector receptacle (variants of LIGHTNING connectors, 30-pin connectors used by APPLE mobile computing devices, etc.), an HDMI connector plug or connector receptacle, and/or any other connector plugs or connector receptacles as may serve a particular implementation.

In certain examples, the digital data transfer protocols associated with both data transfer connector plugs 402 may be the same. For example, both mobile computing devices being linked by linking apparatus 400 may be identical brands and/or models of mobile computing device (e.g., both may be APPLE iPHONE smartphones, both may be SAMSUNG GALAXY S smartphones, etc.), such that both mobile computing devices are associated with the same digital data transfer protocol (e.g., both are associated with the LIGHTNING digital data transfer protocol, both are associated with the USB digital data transfer protocol, etc.) and both have identical data transfer connector receptacles (e.g., both have LIGHTNING data transfer connector receptacles, both have micro USB data transfer connector receptacles, etc.). Accordingly, both data transfer connector plugs 402 may similarly be the same type of data transfer connector plug (e.g., both may be LIGHTNING data transfer connector plugs, both may be micro USB data transfer connector plugs, etc.).

In other examples, the mobile computing devices linked by linking apparatus 400 may be different models, different brands, and/or different types of mobile computing device (e.g., one mobile computing device may be an APPLE iPHONE smartphone while the other mobile computing device may be a SAMSUNG GALAXY S smartphone). Accordingly, in certain examples, data transfer connector plugs 402 may be different types of data transfer connector plugs (e.g., data transfer connector plug 402-1 may be a LIGHTNING data transfer connector plug while data transfer connector plug 402-2 may be a micro USB data transfer connector plug) in order to properly mate with the respective data transfer connector receptacles in each of the different mobile computing devices.

Conductors 404 may be configured to electrically couple data transfer connector plug 402-1 with data transfer connector plug 402-2, as shown. Accordingly, when data transfer connector plugs 402 are each mated with respective data transfer connector receptacles of respective mobile computing devices, conductors 404 may provide a data transfer link between the mobile computing devices. As will be described in more detail below, each of the mobile computing devices may be running a respective instance of a virtual-reality-related application, and data associated with the instances of the virtual-reality-related application may be transferred over the data transfer link provided by conductors 404 in accordance with the respective digital data transfer protocols associated with each data transfer connector plug 402. For example, if both mobile computing devices use a USB 3.1 digital data transfer protocol and both data transfer connector plugs 402 are the same variant of USB connector plug (e.g., Type-C connector plugs), the conductors may provide a USB 3.1 data transfer link between the mobile computing devices over which data associated with the instances of the virtual-reality-related application may be transferred in order to enable the enhanced presentation of the virtual reality experience to the user (e.g., when the first and second mobile computing devices are positioned in front of the respective eyes of the user in the dual-screen extended landscape configuration).

Additional examples and detail about data that may be transferred over the data transfer link to enable the enhanced presentation of the virtual reality experience, including architectures that may be supported by the data transfer link and/or employed by the instances of the virtual-reality-related application, will be described below.

Signal control block 406 may route, connect, switch, or otherwise provide electrical paths between conductors 404 connected with data transfer connector plug 402-1 and conductors 404 connected with data transfer connector plug 402-2. For example, signal control block 406 may provide electrical paths between power conductors from both data transfer connector plugs 402, ground conductors from both data transfer connector plugs 402, data conductors (e.g., differential signaling conductor pairs) from both data transfer connector plugs 402, and/or any other electrical paths as may serve a particular implementation. More specifically, signal control block 406 may route conductors (e.g., differential signaling conductor pairs) for transmitting data coming from data transfer connector plug 402-1 with conductors (e.g., differential signaling conductor pairs) for receiving data coming from data transfer connector plug 402-2. Similarly, signal control block 406 may also route conductors for receiving data coming from data transfer connector plug 402-1 with conductors for transmitting data coming from data transfer connector plug 402-2.

Moreover, in certain examples, signal control block 406 may also include or implement logic or computer-readable instructions for receiving, analyzing, converting, transmitting, and/or otherwise processing electrical signals on conductors 404. For example, in implementations where data transfer connector plugs are associated with different digital data transfer protocols and/or configured to mate with data transfer connector receptacles of different types of mobile computing devices, signal control block 406 may be implemented by or may include a digital processing chip configured to convert data being transferred in accordance with one digital data transfer protocol (e.g., the digital data transfer protocol associated with data transfer connector plug 402-1) into data transferred in accordance with a different digital data transfer protocol (e.g., the digital data transfer protocol associated with data transfer connector plug 402-2). Accordingly, for instance, if data transfer connector plug 402-1 is a LIGHTNING data transfer connector plug configured to mate with a mobile computing device that uses a LIGHTNING digital data transfer protocol, and data transfer connector plug 402-2 is a micro USB data transfer connector plug configured to mate with a mobile computing device that uses a variant of a USB digital data transfer protocol, signal control block 406 may include a digital processing chip that converts LIGHTNING signaling into USB signaling and vice versa.

Housing 408 may house (e.g., contain, hold together, etc.) one or more of the components of linking apparatus 400 described above (e.g., data transfer connector plugs 402, conductors 404, signal control block 406, etc.). As such, housing 408 may be configured to facilitate a positioning of the mobile computing devices (e.g., mobile computing devices 306) mated to respective data transfer connector plugs 402 in front of respective eyes of the user in the dual-screen extended landscape configuration (e.g., for the enhanced presentation of the virtual reality experience to the user) by allowing data transfer connector plugs 402 to mate with the respective data transfer connector receptacles of the mobile computing devices only when the mobile computing devices are physically adjacent to one another.

Figure 5:
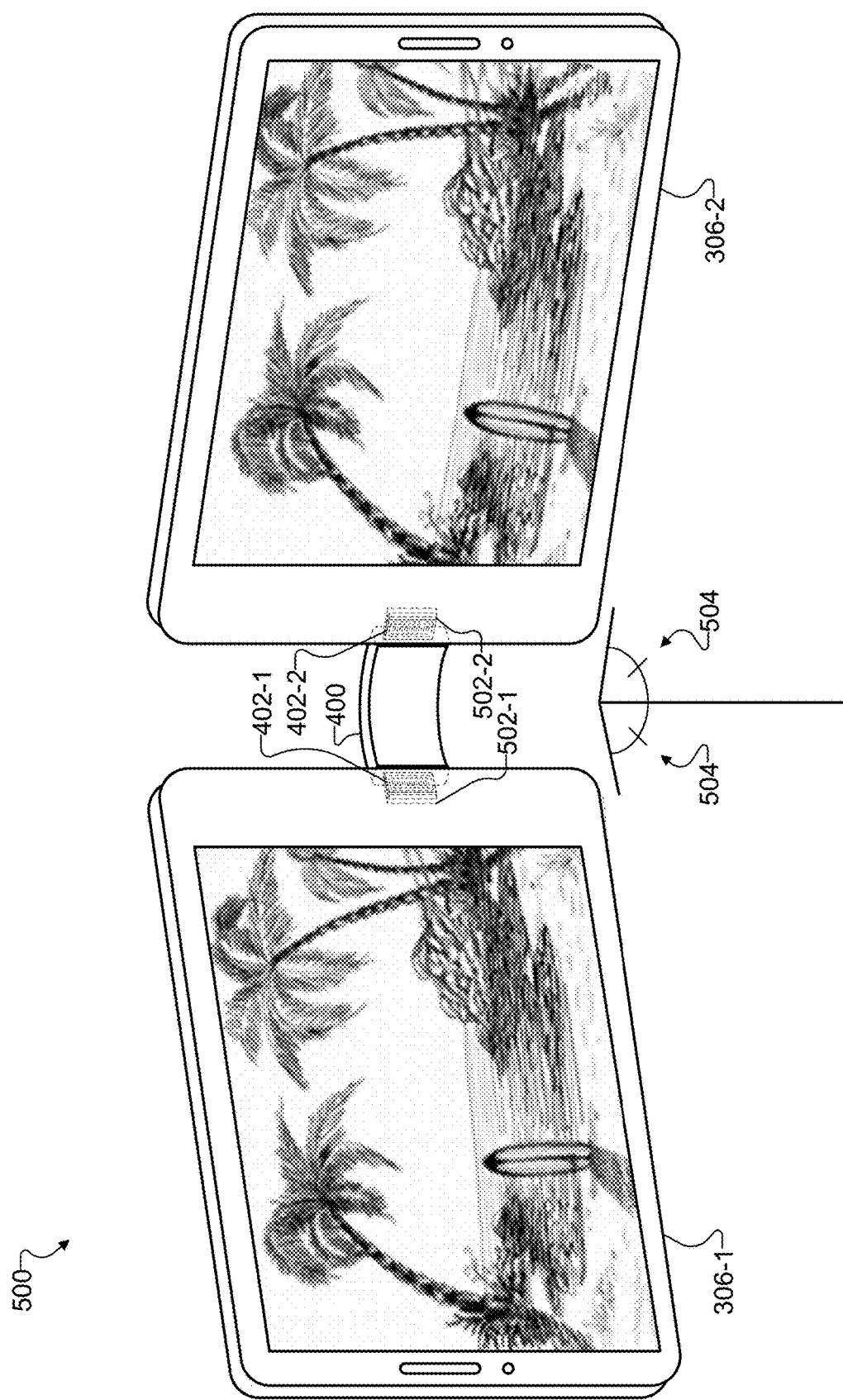
FIG. 5 illustrates an exemplary configuration in which the linking apparatus of FIG. 4 is used to physically and communicatively link mobile computing devices to enhance a virtual reality experience according to principles described herein.

FIG. 5 illustrates an exemplary configuration 500 in which linking apparatus 400 is used to physically and communicatively link mobile computing devices 306 to enhance a virtual reality experience (e.g., for user 202, as described above). As shown, mobile computing devices 306 are positioned in a dual-screen extended landscape configuration (i.e., mobile computing devices 306 are positioned adjacent to one another with respective data transfer connector receptacles 502 facing inward toward one another and both screens facing in substantially the same direction in landscape orientations). Accordingly, with mobile computing devices 306 in the dual-screen extended landscape configuration, the housing 408 of linking apparatus 400 allows the first and second data transfer connector plugs of linking apparatus 400 (i.e., data transfer connector plugs 402) to mate with first and second data transfer connector receptacles 502 (i.e., data transfer connector receptacles 502-1 and 502-2, respectively). In certain examples, housing 408 of linking apparatus 400 may allow the mating of data transfer connector plugs 402 with data transfer connector receptacles 502 only when mobile computing devices 306 are in a dual-screen extended landscape configuration. In other examples, housing 408 may allow the mating of data transfer connector plugs 402 with data transfer connector receptacles 502 as long as mobile computing devices 306 are physically adjacent to one another, even if mobile computing devices 306 are not necessarily in the dual-screen extended landscape configuration.

As illustrated in FIG. 5, each mobile computing device 306 may be positioned at an angle 504 with respect to a line bisecting the dual-screen extended landscape configuration of mobile computing devices 306. As shown, the line may bisect the dual-screen extended landscape configuration symmetrically between mobile computing devices 306 such that angle 504 of each mobile computing device 306 is the same with respect to the line. In certain examples, angle 504 for each mobile computing device 306 may be approximately 90°, such that mobile computing devices 306 are coplanar. In other examples (e.g., such as the example illustrated in FIG. 5), angle 504 may be less than 90° (e.g., between approximately 45° and 90°) such that mobile computing devices 306 are angled inwardly. With an angle less than 90°, mobile computing devices 306 may better contour around a head of user 202 when the mobile computing devices are in front of the respective eyes of the user for the enhanced presentation of the virtual reality experience. Accordingly, a material used to construct housing 408 may facilitate the positioning of mobile computing devices 306 in the dual-screen extended landscape configuration by permitting and/or preventing adjustment of angle 504 in various ways.

Figure 6:
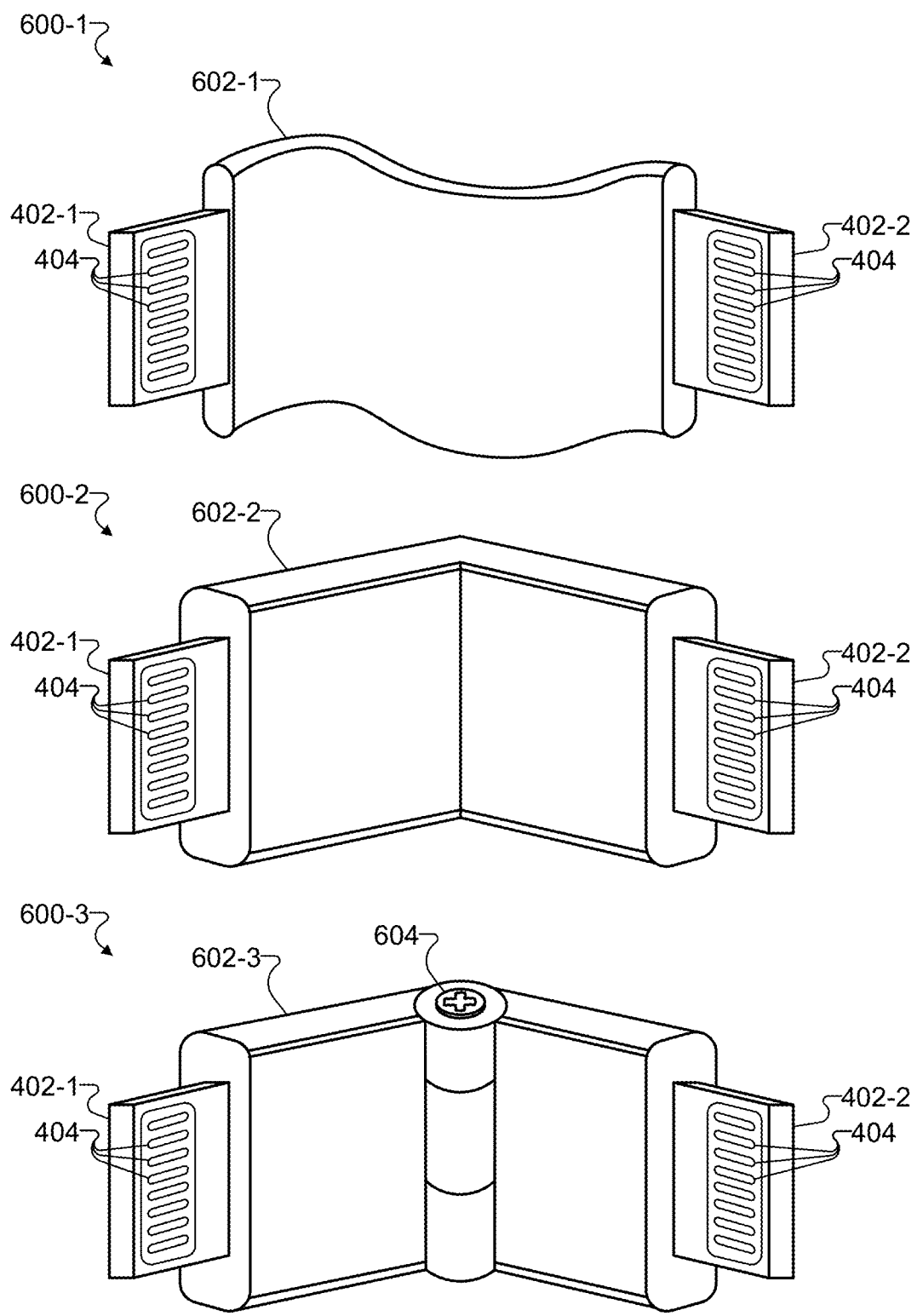
FIG. 6 illustrates exemplary mobile computing device linking apparatuses including housings constructed of various materials for facilitating a positioning of mobile computing devices in various ways according to principles described herein.

To illustrate, FIG. 6 shows exemplary mobile computing device linking apparatuses 600 (e.g., linking apparatuses 600-1, 600-2, and 600-3) that each include housings 602 (e.g., housings 602-1, 602-2, and 602-3, respectively) constructed of various materials and/or with various features for facilitating the positioning of mobile computing devices (e.g., mobile computing devices 306) in various ways. The materials and features with which housings 602 of linking apparatuses 600 are constructed will now be described in more detail. However, it will be understood that the general structure, form, and appearance of linking apparatuses 600 and each respective housing 602 illustrated in FIG. 6 may be exemplary only. Linking apparatuses 600 may include various other structures, forms, and/or appearances (i.e., different from those shown in FIG. 6) as may serve a particular implementation. For example, linking apparatuses 600 may be larger or smaller than shown, may have an appearance or form more closely resembling a cable, or the like.

Housing 602-1 of linking apparatus 600-1 is drawn in FIG. 6 to be thin and wavy to illustrate that housing 602-1 may be constructed of a reshapable material that permits a user adjustment (e.g., an adjustment imposed by user 202) of angle 504 between mobile computing devices 306 during the enhanced presentation of the virtual reality experience to user 202 when the first and second mobile computing devices are positioned in front of the respective eyes of user 202 in the dual-screen extended landscape configuration. The reshapable material of which housing 602-1 is constructed may be plastically deformable, such that, when user 202 performs the user adjustment of angle 504 (e.g., by applying a force to at least one of mobile computing devices 306), housing 602-1 may have little or no elastic tendency to "snap back" to an angle 504 other than the angle 504 imposed by user 202 by way of the user adjustment. Accordingly, in certain examples, housing 602-1 may be very flexible (i.e., "floppy") to allow plastic deformation with very little force applied to adjust angle 504 between the mobile computing devices. In other examples, housing 602-1 may be quite inflexible (i.e., rigid or stiff) to allow plastic deformation only when a more significant force is applied to adjust angle 504.

In contrast, housing 602-2 of linking apparatus 600-2 is drawn in FIG. 6 to be thick with straight lines to illustrate that housing 602-1 may be constructed of a non-reshapable material that prevents the user adjustment (e.g., imposed by user 202) of angle 504 between mobile computing devices 306 during the enhanced presentation of the virtual reality experience to user 202 when the first and second mobile computing devices are positioned in front of the respective eyes of user 202 in the dual-screen extended landscape configuration. More specifically, the non-reshapable material of which housing 602-2 is constructed may be essentially unbendable (e.g., non-deformable) or may be elastically deformable such that, if user 202 attempts to perform a user adjustment of angle 504 (e.g., by applying a force to at least one of mobile computing devices 306), housing 602-2 may have an elastic tendency to "snap back" to an angle 504 at which housing 602-2 is permanently biased (i.e., an angle other than the angle 504 that user 202 tried to impose by way of the attempted user adjustment). Accordingly, in certain examples, housing 602-2 may be relatively flexible to allow elastic deformation with relatively little force applied to temporarily adjust angle 504 between the mobile computing devices before angle 504 elastically snaps back to the original angle 504 when the force is removed. In other examples, housing 602-2 may be relatively inflexible to prevent all or nearly all deformation of housing 602-2.

As yet another example, housing 602-3 of linking apparatus 600-3 is shown in FIG. 6 to include an additional angle-locking feature 604 not included in linking apparatuses 600-1 and 600-2. Housing 602-3 may be constructed of any material as may serve a particular implementation. For example, as illustrated by the relative thickness and straight lines of housing 602-3, housing 602-3 may be constructed of a non-reshapable material similar to or the same as the non-reshapable material of housing 602-2. As such, like housing 602-2, housing 602-3 may normally (e.g., when angle-locking feature 604 is engaged) prevent any permanent user adjustment of angle 504. However, in contrast with housing 602-2, which may always prevent permanent user adjustments from a pre-biased angle 504 built into housing 602-2, housing 602-3 may further include angle-locking feature 604, which may be released to allow a permanent (or semi-permanent) user adjustment to angle 504. Angle-locking feature 604 may take any form as may serve a particular implementation. For example, as illustrated in FIG. 6, angle-locking feature 604 may include a screw that may engage angle-locking feature 604 (i.e., thereby semi-permanently locking angle 504 and preventing user adjustment of angle 504 by applying force to mobile computing devices 306) when tightened down, and that may release angle-locking feature 604 (i.e., thereby unlocking angle 504 to allow user adjustment of angle 504 by applying force to mobile computing devices 306) when loosened. In other examples, angle-locking feature 604 may not include a screw, but may use other mechanical mechanisms to allow a user to engage and/or release angle-locking feature 604.

As described above, in certain examples, various components of a linking apparatus (e.g., the transfer connector plugs, the housing configured to facilitate the positioning of the first and second mobile computing devices, the plurality of conductors electrically coupling the data transfer connector plugs to provide the data transfer link, etc.) may be integrated into a virtual reality head mount that includes a structure configured to house the mobile computing devices in the dual-screen extended landscape configuration, and optical lenses having respective focal lengths configured to bring respective displays of the mobile computing devices into focus when the mobile computing devices are housed within the structure and the virtual reality head mount is mounted to a head of the user. For example, as described above linking apparatus 400 may be partially or full integrated into virtual reality head mount 308.

In addition or as an alternative to the support that a virtual reality head mount may provide for positioning the mobile computing devices in the dual-screen extended landscape configuration, a housing of a linking apparatus may similarly provide physical support (e.g., by a physical support structure) to facilitate the positioning of the mobile computing devices in the dual-screen extended landscape configuration. For example, a housing of a linking apparatus configured to facilitate the positioning of first and second mobile computing devices may include a first structural element configured to seat the first mobile computing device in the dual-screen extended landscape configuration when the first data transfer connector plug is mated with the first data transfer connector receptacle, and a second structural element configured to seat the second mobile computing device in the dual-screen extended landscape configuration when the second data transfer connector plug is mated with the second data transfer connector receptacle.

Figure 7:
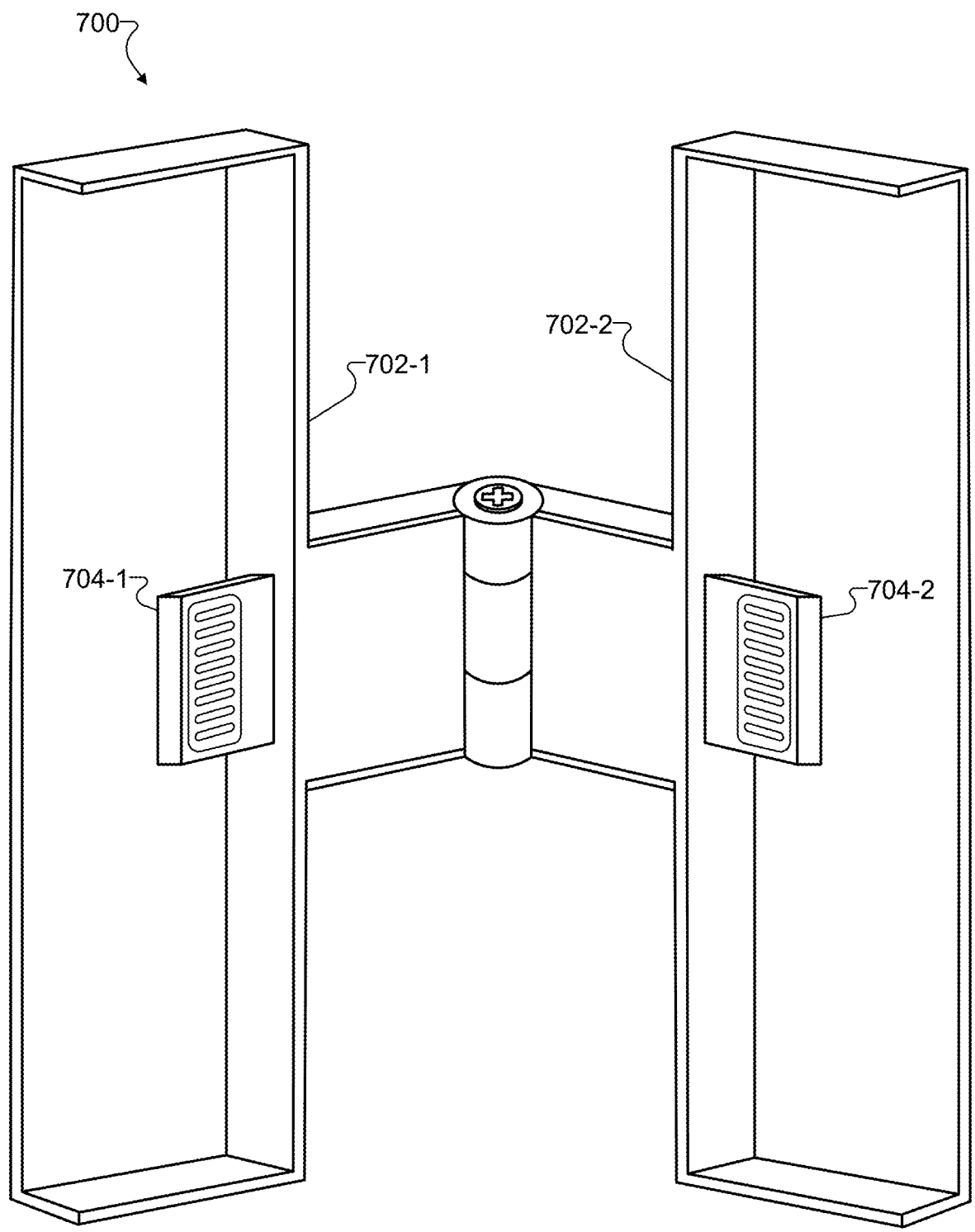
FIG. 7 illustrates an exemplary mobile computing device linking apparatus with a housing that includes exemplary structural elements for seating mobile computing devices according to principles described herein.

To illustrate, FIG. 7 shows an exemplary mobile computing device linking apparatus 700 with a housing that includes exemplary structural elements 702 (e.g., structural elements 702-1 and 702-2) for seating mobile computing devices in a dual-screen extended landscape configuration when respective data transfer connector receptacles of mobile computing devices (not shown in FIG. 7) are mated with corresponding data transfer connector plugs 704 (e.g., data transfer connector plugs 704-1 and 704-2) of linking apparatus 700. More specifically, a first mobile computing device (e.g., mobile computing device 306-1) may be physically held, supported, or otherwise seated into the dual-screen extended landscape configuration by structural element 702-1 when a data transfer connector receptacle of the first mobile computing device (e.g., data transfer connector receptacle 502-1) is mated with data transfer connector plug 704-1 of linking apparatus 700. Similarly, a second mobile computing device (e.g., mobile computing device 306-2) may be physically held, supported, or otherwise seated into the dual-screen extended landscape configuration by structural element 702-2 when a data transfer connector receptacle of the second mobile computing device (e.g., data transfer connector receptacle 502-2) is mated with data transfer connector plug 704-2 of linking apparatus 700.

Accordingly, linking apparatus 700 (i.e., the housing of linking apparatus 700, including structural elements 702) may facilitate the positioning of the first and second mobile computing devices in the dual-screen extended landscape configuration with or without additional support from, for example, a virtual reality head mount such as virtual reality head mount 308. Additionally, linking apparatus 700 (i.e., a housing of linking apparatus 700) may allow and/or prevent user adjustment of an angle between the first and second mobile computing devices during an enhanced presentation of a virtual reality experience in any way as may serve a particular implementation (e.g., in accordance with any of the ways described above in relation to linking apparatuses 600 of FIG. 6).

In certain examples, mobile computing devices running instances of a virtual-reality-related application may use relatively large amounts of power and/or may require relatively large amounts of data. For example, a mobile computing device may rely on battery power provided by a battery (e.g., a built-in rechargeable battery) with a limited capacity and may rely on downloaded data (e.g., real-time downloaded data) rather than data previously stored in a local storage facility of the mobile computing device. As such, supplying sufficient power and/or data (e.g., virtual reality media content data) to a mobile computing device during the presentation of a virtual reality experience to a user, particularly when the virtual reality experience is an enhanced or an extended virtual reality experience, may present a challenge. Thus, in certain examples, linking apparatuses may include additional features to facilitate the supplying of sufficient power and/or data to the mobile computing devices in order to allow for enhanced and/or extended virtual reality experiences to be presented to a user.

Figure 8:
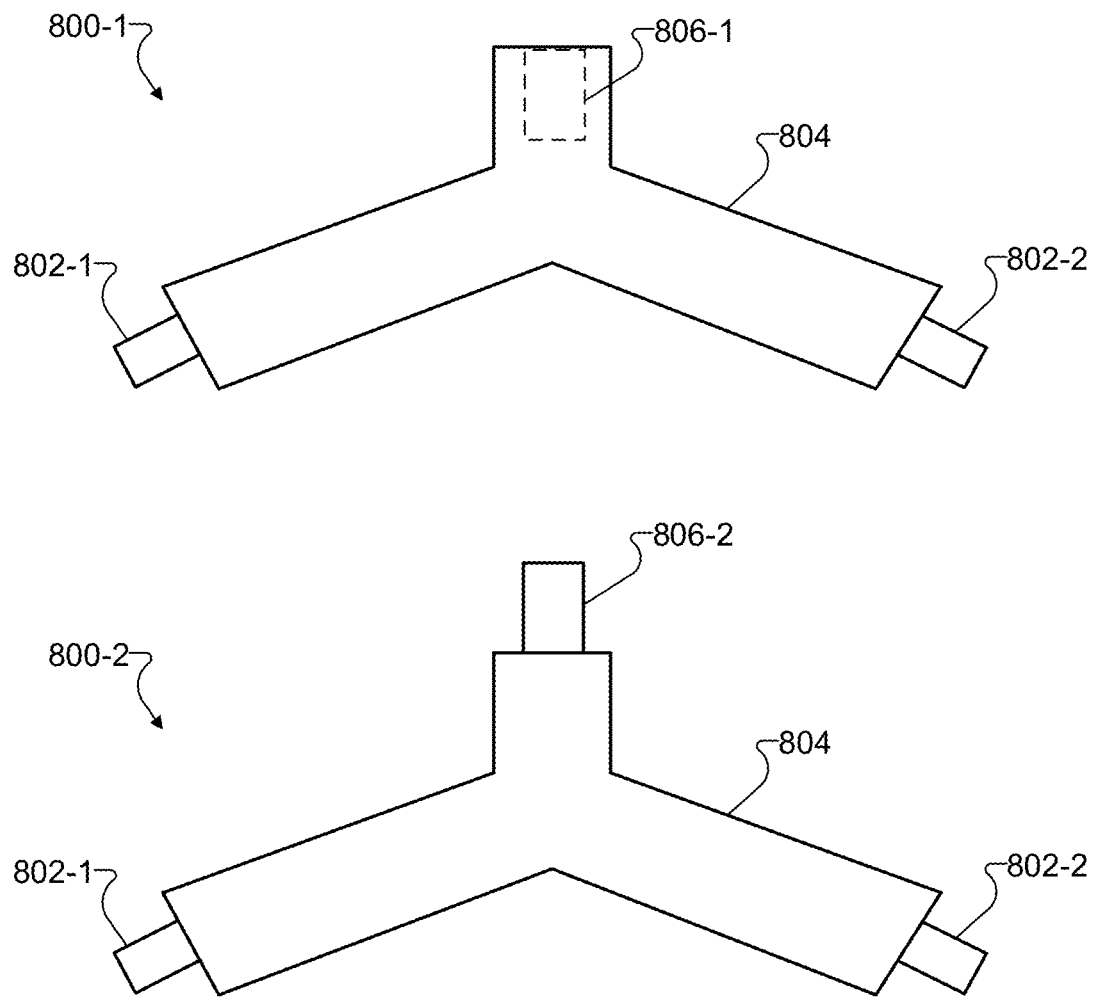
FIG. 8 illustrates exemplary mobile computing device linking apparatuses that include auxiliary connectors according to principles described herein.

To illustrate, FIG. 8 shows exemplary mobile computing device linking apparatuses 800 (e.g., linking apparatuses 800-1 and 800-2) that include auxiliary connectors to facilitate providing power and/or data to mobile computing devices (e.g., during the presentation of a virtual reality experience). In FIG. 8, both linking apparatuses 800 are shown to include respective data transfer connector plugs 802 (e.g., data transfer connector plugs 802-1 and 802-2), and respective housings 804. Data transfer connector plugs 802 and housing 804 of each linking apparatus 800 may be similar or identical to other data transfer connector plugs and/or housings of other linking apparatuses described herein (e.g., data transfer connector plug 402 and housing 408 of linking apparatus 400). Additionally, while other elements of linking apparatuses 800 are not explicitly shown in FIG. 8, it will be understood that linking apparatuses 800 may similarly include respective conductors, signal control blocks, structural elements and/or any other elements described herein or as may serve a particular implementation.

In contrast to previous linking apparatuses described above, however, linking apparatuses 800 may each include an auxiliary connector 806 (e.g., auxiliary connector receptacle 806-1 in the case of linking apparatus 800-1, and auxiliary connector plug 806-2 in the case of linking apparatus 800-2). Auxiliary connectors 806 may each be electrically coupled (e.g., by way of a plurality of conductors, not explicitly shown) to at least one of data transfer connector plugs 802-1 and 802-2. Accordingly, when data transfer connector plugs 802 are mated with respective connector receptacles of mobile computing devices, auxiliary connectors 806 may each be configured to provide a power connection by which external power may be provided to at least one of the mobile computing devices (e.g., in order to power and/or charge a battery of the mobile computing device or devices). Additionally or alternatively, auxiliary connectors 806 may provide another data transfer link (e.g., in addition to the data transfer link provided by the plurality of conductors between data transfer connector plugs 802) by which additional data associated with at least one instance of a virtual-reality-related application running on one of the mobile computing devices may be transferred in accordance with an appropriate digital data transfer protocol (i.e., a digital data transfer protocol corresponding to the mobile computing device or devices to which data is being transferred). For example, rather than downloading virtual reality media content data using a wireless interface, in certain examples, one or more of the mobile computing devices may download virtual reality media content data using a wired interface by way of the other data transfer link provided by linking apparatuses 800 through auxiliary connectors 806.

Auxiliary connector 806 may take any form or appearance as may serve a particular implementation. For example, as illustrated by linking apparatus 800-1, auxiliary connector 806-1 may be an auxiliary connector receptacle. Conversely, as illustrated by linking apparatus 800-2, auxiliary connector 806-2 may be an auxiliary connector plug. Additionally, auxiliary connector 806 may be placed in any location within the housing of linking apparatus 800.

As described above, linking apparatuses may include pluralities of conductors electrically coupling data transfer connector plugs included on the linking apparatuses such that, when the data transfer connector plugs are mated with respective data transfer connector receptacles of mobile computing devices (e.g., mobile computing devices positioned in a dual-screen extended landscape configuration), a data transfer link between the mobile computing devices may be provided over which data may be transferred. In certain examples, the data transferred over the data link may be data associated with first and second instances of a virtual-reality-related application that enables an enhanced presentation of a virtual reality experience to a user when the mobile computing devices are positioned in front of the respective eyes of the user in the dual-screen extended landscape configuration.

Figure 9:
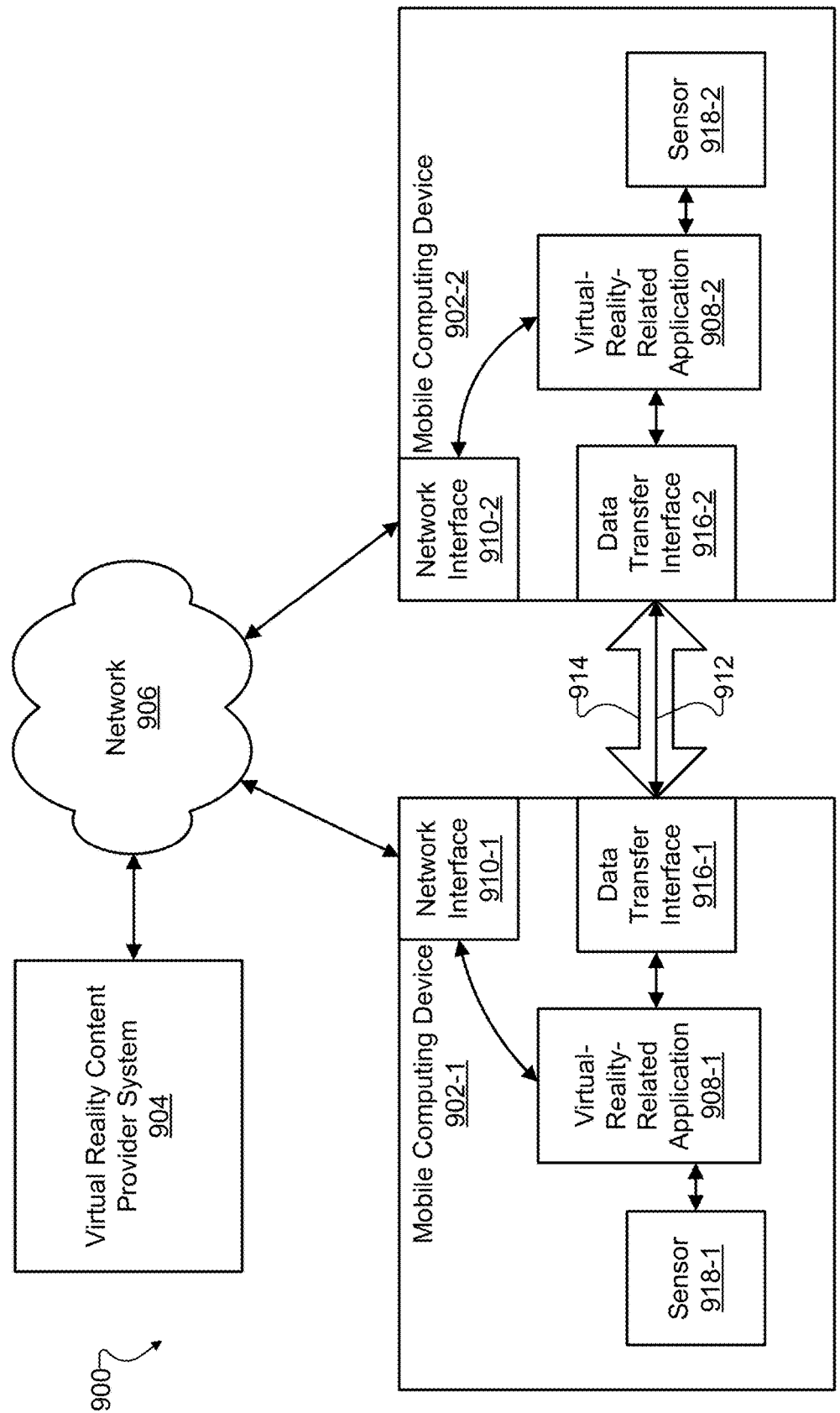
FIG. 9 illustrates an exemplary configuration in which exemplary instances of a virtual-reality-related application running on mobile computing devices physically and communicatively linked together by an exemplary mobile computing device linking apparatus provide an enhanced virtual reality experience by communicating over a data transfer link provided by the linking apparatus according to principles described herein.

FIG. 9 shows an exemplary configuration 900 in which exemplary instances of a virtual-reality-related application running on mobile computing devices physically and communicatively linked together by an exemplary mobile computing device linking apparatus provide an enhanced virtual reality experience by communicating over a data transfer link provided by the linking apparatus. Specifically, FIG. 9 shows a first mobile computing device 902-1 and a second mobile computing device 902-2 (collectively referred to as mobile computing devices 902) that may each be similar to other mobile computing devices described herein. For example, mobile computing devices 902 may be smartphones or other types of mobile computing devices of the same or different brands and models.

As shown, mobile computing devices 902 may be communicatively coupled to a virtual reality content provider system 904 by way of a network 906. For example, content provider system 904 may be a server remote from mobile computing devices 902 (e.g., similar to backend system 108 of FIG. 1) that provides virtual reality media content representative of immersive virtual reality worlds (e.g., such as world 208 of FIG. 2) to media player devices (e.g., such as mobile computing devices 902) in order to present users of the media player devices with a virtual reality experience. Network 906 may include any type or types of networks and/or network technologies (e.g., a cellular provider network, the Internet, etc.), as described above with respect to network 110 in FIG. 1.

Running on respective mobile computing devices 902, either or both of a first instance 908-1 and a second instance 908-2 of a virtual-reality-related application (collectively referred to as instances 908 of the virtual-reality-related application) may communicate with content provider system 904 by way of a connection to network 906 provided by respective network interfaces 910 (e.g., network interface 910-1 in the case of instance 908-1 of the virtual-reality-related application and network 910-2 in the case of instance 908-2 of the virtual-reality-related application). For example, network interfaces 910 may be wireless network interfaces and the connection between network interfaces 910 and network 906 may be a wireless (e.g., cellular data) connection. By way of network 906 and network interfaces 910, either or both instances 908 of the virtual-reality-related application may download virtual reality media content from content provider system 904 to allow instances 908 to present the virtual reality media content to a user experiencing an immersive virtual reality world.

In order to enhance the virtual reality experience (e.g., by presenting the virtual reality experience on both mobile computing devices 902 in a dual-screen extended landscape configuration to extend the viewing angle of the field of view for the user, etc.), instances 908 of the virtual-reality-related application may also communicate with one another. In particular, instances 908 may transfer data over a data transfer link 912 provided by conductors of a linking apparatus 914 to which mobile computing devices 902 are both connected. For example, instances 908 of the virtual-reality-related application may transfer data over data transfer link 912 in accordance with respective digital data transfer protocols (e.g., USB, LIGHTNING, etc.) based on whatever type of digital data transfer protocol each mobile computing device 902 is associated with. For example, mobile computing device 902-1 may include a data transfer interface 916-1 that is associated with a first digital data transfer protocol, while mobile computing device 902-2 may include a data transfer interface 916-2 that is associated with a second digital data transfer protocol (e.g., the same as or different from the first digital data transfer protocol).

Instances 908 of the virtual-reality-related application running on mobile computing devices 902 may transfer any data as may serve a particular implementation to enhance the presentation of a virtual reality experience for a user in front of whose eyes mobile computing devices 902 are positioned. For example, in certain implementations, instances 908 may employ, and data transfer link 912 may support, a primary-secondary architecture (e.g., also referred to as a "master-slave" architecture) in which video data for the enhanced presentation of the virtual reality experience is transmitted by content provider system 904 to only a primary instance 908 of the virtual-reality-related application (i.e., instance 908-1 in this example). In other words, in this example, content provider system 904 may not transmit video data for the enhanced virtual reality experience to instance 908-2 of the virtual-reality-related application running on mobile computing device 902-2. Accordingly, the data transferred over data transfer link 912 in accordance with the first and second digital data transfer protocols to enable the enhanced presentation of the virtual reality experience in this example may include the video data being transferred, by the primary instance of the virtual-reality-related application (i.e., instance 908-1), to a secondary instance of the virtual-reality-related application over the data transfer link (i.e., instance 908-2).

In this way, both instances 908 of the virtual-reality-related application may access video data needed for the enhanced presentation of the virtual reality experience to the user. The primary instance (i.e., instance 908-1) receives all the video data directly from content provider system 904 (e.g., by way of network 906 and network interface 910-1), while the secondary instance (i.e., instance 908-2) receives the video data from the primary instance (e.g., by way of data transfer link 912 and data transfer interfaces 916). In some examples, the secondary instance may receive all the video data (e.g., the same data that the primary instance received from content provider system 904, which may include stereoscopic versions of the video data for each eye), while, in other examples, the secondary instance may receive only video data that the secondary mobile computing device (i.e., mobile computing device 902-2 in this example) is to display for the enhanced presentation of the virtual reality experience.

A particular instance 908 of the virtual-reality-related application may be selected to act as the primary instance in the primary-secondary scheme in any way as may serve a particular implementation. For example, instance 908-1 may be selected to act as the primary instance in the primary-secondary architecture and instance 908-2 may be selected to act as the secondary instance in the primary-secondary architecture based on a determination that mobile computing device 902-1 has performance capabilities (e.g., processor speed, memory or storage capabilities, etc.) superior to mobile computing device 902-2, a determination that instance 908-1 was launched prior to instance 908-2, a detection that the user selects (e.g., via a user selection mechanism presented in a user interface on one or more of mobile computing devices 902) instance 908-1 as the primary instance of the virtual-reality-related application, and/or a random selection of instance 908-1 as the primary instance of the virtual-reality-related application.

In other examples, rather than a primary-secondary architecture, instances 908 of the virtual-reality-related application may employ, and data transfer link 912 may support, a peer-to-peer architecture in which video data for the enhanced presentation of the virtual reality experience is transmitted by content provider system 904 to both instances 908 of the virtual-reality-related application. As such, the data transferred over data transfer link 912 in accordance with the first and second digital data transfer protocols to enable the enhanced presentation of the virtual reality experience may include synchronization data being exchanged between mobile computing devices 902 over data transfer link 912. For example, video synchronization information (e.g., horizontal synchronization information, vertical synchronization information, etc.) and/or other types of information facilitating the synchronization and/or cooperation of mobile computing devices 902 in presenting the enhanced virtual reality experience may be transferred as may serve a particular implementation. It will be understood that synchronization information and other suitable types of information may also be transferred over data transfer link 912 (e.g., along with the video data) in implementations where the primary-secondary architecture is employed.

Also communicatively coupled with instances 908 of the virtual-reality-related application in FIG. 9 are respective sensors 918 (e.g., sensor 918-1 in mobile computing device 902-1 and sensor 918-2 in mobile computing device 902-2). Sensors 918 may each include one or more different types of spatial or movement sensors (e.g., positional sensors, orientational sensors, acceleration sensors, etc.) used by mobile computing devices 902 to determine where mobile computing devices 902 are in space, how mobile computing devices 902 are oriented or positioned in space, whether and/or to what extent mobile computing devices 902 are moving through space, and the like. Such sensors may be used by mobile computing devices 902 while presenting a virtual reality experience to a user to detect user input (e.g., to determine which direction the user wishes to look, which way the user wants to move, etc.). However, as mentioned above, sensor data from just one sensor (or set of sensors) 918 from just one mobile computing device 902 may be less accurate and/or reliable than when measurements from sensors (or sets of sensors) 918 from both mobile computing devices 902 are combined, averaged, and/or otherwise used together.

Accordingly, in some examples, the data transferred over data transfer link 912 in accordance with the first and second digital data transfer protocols to enable the enhanced presentation of the virtual reality experience may further include sensor data representative of at least one of a position, a movement, and an orientation of mobile computing device 902-1 as detected by sensor 918-1 included within mobile computing device 902-1 and transmitted by instance 908-1 of the virtual-reality-related application to instance 908-2 of the virtual-reality-related application. The sensor data detected by sensor 918-1 may be used to generate improved sensor data that is based on a combination of the sensor data detected by sensor 918-1 and corresponding sensor data detected by sensor 918-2 included within mobile computing device 902-2. Similar to the sensor data detected by sensor 918-1, the corresponding sensor data detected by sensor 918-2 may represent of at least one of a position, a movement, and an orientation of mobile computing device 902-2, and may correspond to the at least one of the position, the movement, and the orientation of mobile computing device 902-1 as detected by sensor 918-1. Accordingly, the improved sensor data may be used by either or both instances 908 of the virtual-reality-related application to present the enhanced virtual reality experience to the user.

Figure 10:
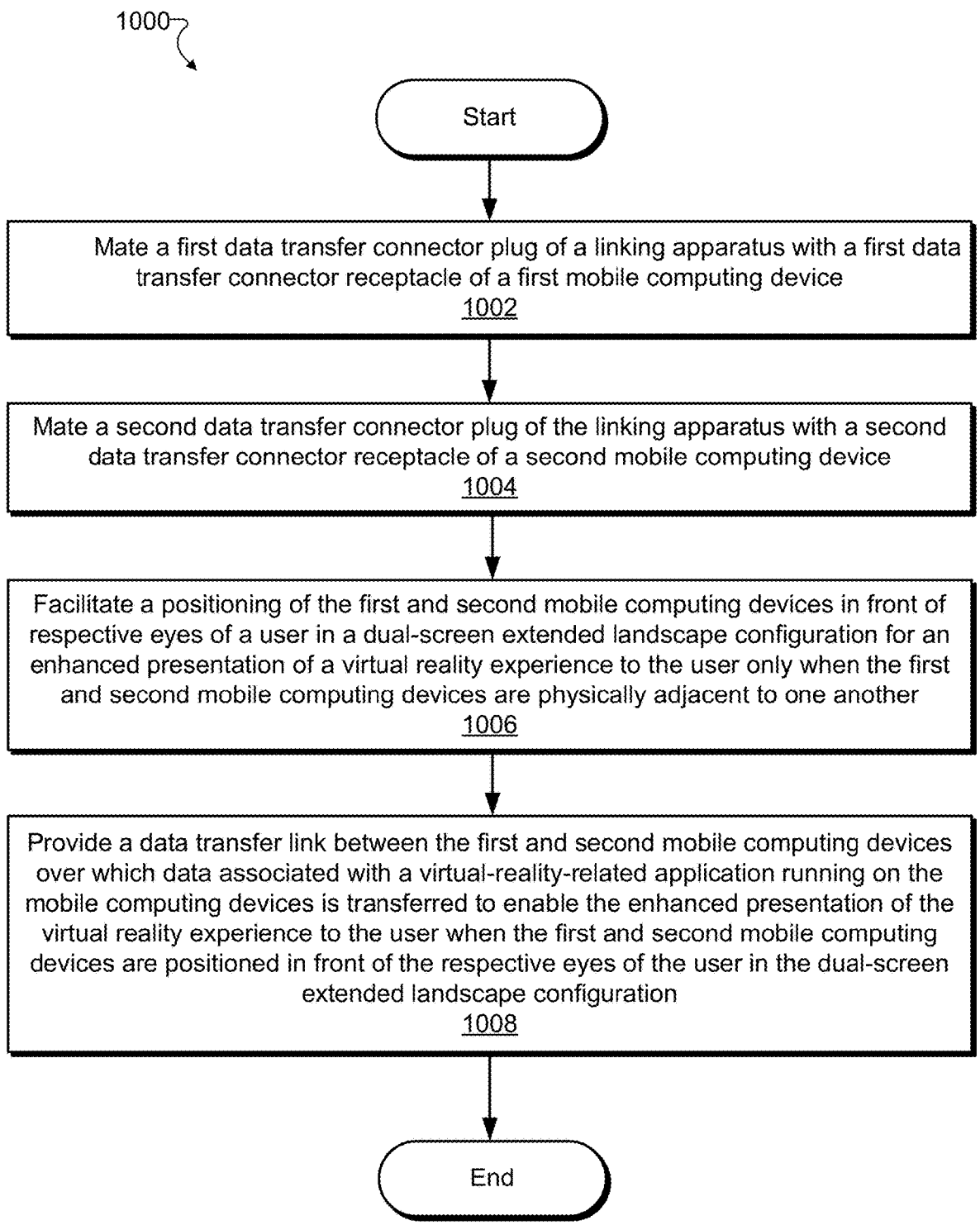
FIG. 10 illustrates an exemplary method for physically and communicatively linking mobile computing devices to enhance virtual reality experiences according to principles described herein.

FIG. 10 illustrates an exemplary method 1000 for physically and communicatively linking mobile computing devices to enhance virtual reality experiences. While FIG. 10 illustrates exemplary operations according to one embodiment, other embodiments may omit, add to, reorder, and/or modify any of the operations shown in FIG. 10. One or more of the operations shown in FIG. 10 may be performed by linking apparatus 400 (or components thereof) and/or by any another suitable mobile computing device linking apparatus (or components thereof) such as those described herein.

In operation 1002, a first data transfer connector plug included on a mobile computing device linking apparatus may mate with a first data transfer connector receptacle of a first mobile computing device. The first data transfer connector plug may be associated with a first digital data transfer protocol. Additionally, the first mobile computing device may be configured to run a first instance of a virtual-reality-related application and to run one or more non-virtual-reality-related applications. Operation 1002 may be performed in any of the ways described herein.

In operation 1004, a second data transfer connector plug included on the mobile computing device linking apparatus may mate with a second data transfer connector receptacle of a second mobile computing device. The second data transfer connector plug may be associated with a second digital data transfer protocol (e.g., the same or a different digital data transfer protocol as the first digital data transfer protocol). Additionally, the second mobile computing device may be configured to run a second instance of the virtual-reality-related application and, like the first mobile computing device, to also run one or more non-virtual-reality-related applications. Operation 1004 may be performed in any of the ways described herein.

In operation 1006, a housing of the mobile computing device linking apparatus that houses the first and second data transfer connector plugs may facilitate a positioning of the first and second mobile computing devices in front of respective eyes of a user in a dual-screen extended landscape configuration for an enhanced presentation of a virtual reality experience to the user. Operation 1006 may be performed in any of the ways described herein. For example, the housing may facilitate the positioning of the mobile computing devices in response to (e.g., based upon) the mating of the first and second data transfer connector plugs in operations 1002 and 1004, respectively, with the respective first and second data transfer connector receptacles. Operation 1006 may be performed by allowing operations 1002 and 1004 to be performed only when the first and second mobile computing devices are physically adjacent to one another.

In operation 1008, a plurality of conductors of the mobile computing device linking apparatus may provide a data transfer link between the first and second mobile computing devices over which data associated with the first and second instances of the virtual-reality-related application may be transferred in accordance with the first and second digital data transfer protocols. For example, the data may be transferred to enable the enhanced presentation of the virtual reality experience to the user when the first and second mobile computing devices are positioned in front of the respective eyes of the user in the dual-screen extended landscape configuration. Operation 1008 may be performed in any of the ways described herein. For example, the plurality of conductors may electrically couple the first data transfer connector plug with the second data transfer connector plug such that the data transfer link may be provided in response to the mating of the first and second data transfer connector plugs with the respective first and second data transfer connector receptacles in operations 1002 and 1004.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 11:
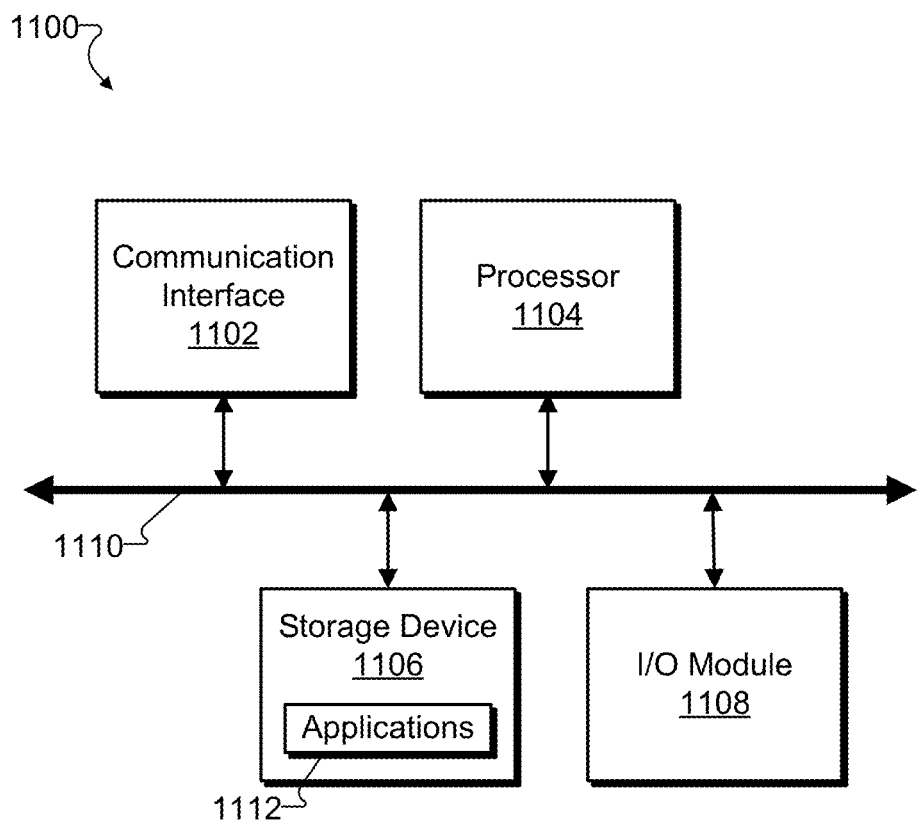
FIG. 11 illustrates an exemplary computing device according to principles described herein.

FIG. 11 illustrates an exemplary computing device 1100 that may be specifically configured to perform one or more of the processes described herein. As shown in FIG. 11, computing device 1100 may include a communication interface 1102, a processor 1104, a storage device 1106, and an input/output ("I/O") module 1108 communicatively connected via a communication infrastructure 1110. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1106. For example, data representative of one or more executable applications 1112 configured to direct processor 1104 to perform any of the operations described herein may be stored within storage device 1106. In some examples, data may be arranged in one or more databases residing within storage device 1106.

I/O module 1108 may be configured to receive user input and provide user output and may include any hardware, firmware, software, or combination thereof supportive of input and output capabilities. For example, I/O module 1108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. An apparatus comprising:
a first data transfer connector plug configured to mate with a first data transfer connector receptacle of a first mobile computing device;
a second data transfer connector plug configured to mate with a second data transfer connector receptacle of a second mobile computing device;
a housing that houses the first and second data transfer connector plugs and that is configured to facilitate a positioning of the first and second mobile computing devices in a dual-screen extended configuration in front of respective eyes of a user; and
a plurality of conductors electrically coupling the first and second data transfer connector plugs to provide a data transfer link between the first and second mobile computing devices when the first and second data transfer connector plugs are mated with the first and second data transfer connector receptacles, respectively;
wherein:
when the first and second data transfer connector plugs are mated with the first and second data transfer connector receptacles, respectively, sensor data is transferred over the data transfer link from the first mobile computing device to the second mobile computing device;
the sensor data is representative of at least one of a position, a movement, and an orientation of the first mobile computing device as detected by a first sensor included within the first mobile computing device; and
the sensor data is used to generate improved sensor data based on a combination of the sensor data detected by the first sensor and additional sensor data that is detected by a second sensor included within the second mobile computing device and that corresponds to the sensor data detected by the first sensor.

2. The apparatus of claim 1, wherein:
the first data transfer connector plug is associated with a first digital data transfer protocol;
the second data transfer connector plug is associated with a second digital data transfer protocol;
the first and second mobile computing devices are each configured to execute respective instances of a virtual-reality-related application, the respective instances of the virtual-reality-related application configured to transfer data associated with the virtual-reality-related application over the data transfer link and in accordance with the first and second digital data transfer protocols; and
the transferring of the data associated with the virtual-reality-related application enables an enhanced presentation, to the user when the first and second mobile computing devices are positioned in the dual-screen extended configuration in front of the respective eyes of the user, of a virtual reality experience associated with the virtual-reality-related application.

3. The apparatus of claim 2, wherein the first digital data transfer protocol is a same digital data transfer protocol as the second digital data transfer protocol.

4. The apparatus of claim 2, wherein the first digital data transfer protocol is a different digital data transfer protocol than the second digital data transfer protocol.

5. The apparatus of claim 1, wherein:
when the first and second data transfer connector plugs are mated with the first and second data transfer connector receptacles, respectively, a first instance of a software application executes on the first mobile computing device and a second instance of the software application executes on the second mobile computing device;
the data transfer link between the first and second mobile computing devices supports a primary-secondary architecture in which application data associated with the software application is transmitted by a system separate from the first and second mobile computing devices to only the first instance of the software application; and
at least some of the application data is transferred by the first instance executing on the first mobile computing device to the second instance executing on the second mobile computing device by way of the data transfer link.

6. The apparatus of claim 1, wherein:
when the first and second data transfer connector plugs are mated with the first and second data transfer connector receptacles, respectively, a first instance of a software application executes on the first mobile computing device and a second instance of the software application executes on the second mobile computing device;
the data transfer link between the first and second mobile computing devices supports a peer-to-peer architecture in which application data associated with the software application is transmitted by a system separate from the first and second mobile computing devices to both the first and second instances of the software application; and
synchronization data associated with the software application is exchanged between the first and second instances of the software application executing on the first and second mobile computing devices, respectively, by way of the data transfer link.

7. The apparatus of claim 1, wherein:
the housing is configured to facilitate the positioning of the first and second mobile computing devices in a dual-screen extended landscape configuration for an enhanced presentation of a virtual reality experience to the user; and
the dual-screen extended landscape configuration is facilitated by allowing the first and second data transfer connector plugs to mate with the first and second data transfer connector receptacles, respectively, only when the first and second mobile computing devices are physically adjacent to one another and positioned in the dual-screen extended landscape configuration.

8. The apparatus of claim 1, wherein the housing is constructed of a reshapable material configured to permit a user adjustment of an angle between the first and second mobile computing devices when the first and second mobile computing devices are positioned in the dual-screen extended configuration in front of the respective eyes of the user.

9. The apparatus of claim 1, wherein the housing is constructed of a non-reshapable material configured to prevent a user adjustment of an angle between the first and second mobile computing devices when the first and second mobile computing devices are positioned in the dual-screen extended configuration in front of the respective eyes of the user.

10. The apparatus of claim 1, wherein the housing is constructed of a non-reshapable material configured to prevent a user adjustment of an angle between the first and second mobile computing devices when the first and second mobile computing devices are positioned in the dual-screen extended configuration in front of the respective eyes of the user except when an angle-locking feature of the housing is released.

11. The apparatus of claim 1, wherein the housing includes:
a first structural element configured to seat the first mobile computing device in the dual-screen extended configuration when the first data transfer connector plug is mated with the first data transfer connector receptacle; and
a second structural element configured to seat the second mobile computing device in the dual-screen extended configuration when the second data transfer connector plug is mated with the second data transfer connector receptacle.

12. The apparatus of claim 1, further comprising an auxiliary connector electrically coupled, by way of the plurality of conductors, to at least one of the first and second data transfer connector plugs, the auxiliary connector configured to provide, when the first and second data transfer connector plugs are mated with the first and second data transfer connector receptacles, respectively, at least one of:
a power connection by which external power is provided to at least one of the first and second mobile computing devices; and
another data transfer link by way of which application data associated with a software application executing on at least one of the first and second mobile computing devices is transferred to the at least one of the first and second mobile computing devices.

13. A method comprising:
mating, by a first data transfer connector plug included on a linking apparatus, with a first data transfer connector receptacle of a first mobile computing device;
mating, by a second data transfer connector plug included on the linking apparatus, with a second data transfer connector receptacle of a second mobile computing device;
facilitating, by a housing of the linking apparatus that houses the first and second data transfer connector plugs and when the mating of the first and second data transfer connector plugs with the respective first and second data transfer connector receptacles is performed, a positioning of the first and second mobile computing devices in a dual-screen extended configuration in front of respective eyes of a user; and
providing, by a plurality of conductors of the linking apparatus electrically coupling the first and second data transfer connector plugs when the mating of the first and second data transfer connector plugs with the respective first and second data transfer connector receptacles is performed, a data transfer link between the first and second mobile computing devices;
wherein:

when the mating of the first and second data transfer connector plugs with the respective first and second data transfer connector receptacles is performed, sensor data is transferred over the data transfer link from the first mobile computing device to the second mobile computing device,
the sensor data is representative of at least one of a position, a movement, and an orientation of the first mobile computing device as detected by a first sensor included within the first mobile computing device, and
the sensor data is used to generate improved sensor data based on a combination of the sensor data detected by the first sensor and additional sensor data that is detected by a second sensor included within the second mobile computing device and that corresponds to the sensor data detected by the first sensor.

14. The method of claim 13, wherein:
the first data transfer connector plug is associated with a first digital data transfer protocol;
the second data transfer connector plug is associated with a second digital data transfer protocol;
the first and second mobile computing devices are each configured to execute respective instances of a virtual-reality-related application; and
the method further comprises conducting, by the plurality of conductors of the linking apparatus by way of the data transfer link and in accordance with the first and second digital data transfer protocols, data associated with the virtual-reality-related application and transferred by the respective instances of the virtual-reality-related application, the transferring of the data enabling an enhanced presentation, to the user when the first and second mobile computing devices are positioned in the dual-screen extended configuration in front of the respective eyes of the user, of a virtual reality experience associated with the virtual-reality-related application.

15. The method of claim 14, wherein the first digital data transfer protocol is a same digital data transfer protocol as the second digital data transfer protocol.

16. The method of claim 14, wherein the first digital data transfer protocol is a different digital data transfer protocol than the second digital data transfer protocol.

17. The method of claim 13, wherein:
when the mating of the first and second data transfer connector plugs with the respective first and second data transfer connector receptacles is performed, a first instance of a software application executes on the first mobile computing device and a second instance of the software application executes on the second mobile computing device;
the data transfer link between the first and second mobile computing devices supports a primary-secondary architecture in which application data associated with the software application is transmitted by a system separate from the first and second mobile computing devices to only the first instance of the software application; and
the method further comprises conducting, by the plurality of conductors of the linking apparatus by way of the data transfer link, at least some of the application data from the first instance executing on the first mobile computing device to the second instance executing on the second mobile computing device.

18. The method of claim 13, wherein:
when the mating of the first and second data transfer connector plugs with the respective first and second data transfer connector receptacles is performed, a first instance of a software application executes on the first mobile computing device and a second instance of the software application executes on the second mobile computing device;

the data transfer link between the first and second mobile computing devices supports a peer-to-peer architecture in which application data associated with the software application is transmitted by a system separate from the first and second mobile computing devices to both the first and second instances of the software application; and the method further comprises conducting, by the plurality of conductors of the linking apparatus by way of the data transfer link, synchronization data associated with the software application and exchanged between the first and second instances of the software application executing on the first and second mobile computing devices, respectively.

19. A system comprising:

a virtual reality head mount configured to house a first mobile computing device and a second mobile computing device in a dual-screen extended configuration;

a first optical lens integrated into the virtual reality head mount and having a focal length configured to bring a display of the first mobile computing device into focus when the first mobile computing device is housed within the virtual reality head mount and the virtual reality head mount is mounted to a head of the user;

a second optical lens integrated into the virtual reality head mount and having a focal length configured to bring a display of the second mobile computing device into focus when the second mobile computing device is housed within the virtual reality head mount and the virtual reality head mount is mounted to the head of the user; and a mobile computing device linking apparatus integrated into the virtual reality head mount and comprising:

a first data transfer connector plug configured to mate with a first data transfer connector receptacle of the first mobile computing device, a second data transfer connector plug configured to mate with a second data transfer connector receptacle of the second mobile computing device, a housing that houses the first and second data transfer connector plugs and that is configured to facilitate a positioning of the first and second mobile computing devices in the dual-screen extended configuration to be viewed by the user through the first and second optical lenses when the first and second mobile computing devices are housed within the virtual reality head mount and the virtual reality head mount is mounted to the head of the user, and a plurality of conductors electrically coupling the first and second data transfer connector plugs to provide a data transfer link between the first and second mobile computing devices when the first and second data transfer connector plugs are mated with the first and second data transfer connector receptacles, respectively;

wherein:

when the first and second data transfer connector plugs are mated with the first and second data transfer connector receptacles, respectively, sensor data is transferred over the data transfer link from the first mobile computing device to the second mobile computing device, the sensor data is representative of at least one of a position, a movement, and an orientation of the first mobile computing device as detected by a first sensor included within the first mobile computing device, and the sensor data is used to generate improved sensor data based on a combination of the sensor data detected by the first sensor and additional sensor data that is detected by a second sensor included within the second mobile computing device and that corresponds to the sensor data detected by the first sensor.

20. The system of claim 19, wherein:

the first data transfer connector plug is associated with a first digital data transfer protocol;

the second data transfer connector plug is associated with a second digital data transfer protocol;

the first and second mobile computing devices are each configured to execute respective instances of a virtual-reality-related application, the respective instances of the virtual-reality-related application configured to transfer data associated with the virtual-reality-related application over the data transfer link and in accordance with the first and second digital data transfer protocols; and the transferring of the data associated with the virtual-reality-related application enables an enhanced presentation, to the user when the first and second mobile computing devices are positioned in the dual-screen extended configuration in front of the respective eyes of the user, of a virtual reality experience associated with the virtual-reality-related application.

* * * * *